(12) United States Patent
Ells

(10) Patent No.: US 12,175,546 B2
(45) Date of Patent: Dec. 24, 2024

(54) MAKE LINE OPTIMIZATION

(71) Applicant: Chipotle Mexican Grill, Inc., Denver, CO (US)

(72) Inventor: M. Steven Ells, New York, NY (US)

(73) Assignee: CHIPOTLE MEXICAN GRILL, INC., Denver, CO (US)

( * ) Notice: Subject to any disclaimer, the term of this patent is extended or adjusted under 35 U.S.C. 154(b) by 724 days.

(21) Appl. No.: 15/618,273

(22) Filed: Jun. 9, 2017

(65) Prior Publication Data

US 2017/0365017 A1 Dec. 21, 2017

Related U.S. Application Data

(60) Provisional application No. 62/351,650, filed on Jun. 17, 2016.

(51) Int. Cl.
*G06Q 50/12* (2012.01)
*G06Q 20/20* (2012.01)
*G06Q 20/32* (2012.01)

(52) U.S. Cl.
CPC .......... *G06Q 50/12* (2013.01); *G06Q 20/208* (2013.01); *G06Q 20/3278* (2013.01)

(58) Field of Classification Search
CPC .......... G06K 9/6253; G06K 19/06037; G06K 7/1443; G06K 9/00201; G06K 9/00744; G06Q 20/40145; G06Q 20/3276
USPC .......................................................... 99/326
See application file for complete search history.

(56) References Cited

U.S. PATENT DOCUMENTS

| | | | |
|---|---|---|---|
| 5,321,246 A | 6/1994 | Shepard et al. | |
| 5,540,943 A * | 7/1996 | Naramura | A21C 9/04 426/231 |
| 5,788,934 A | 8/1998 | Lhenry et al. | |
| 5,948,356 A | 9/1999 | Lhenry et al. | |
| 6,334,684 B1 * | 1/2002 | Yoshida | G03B 21/001 353/28 |
| 6,635,223 B2 | 10/2003 | Maerz | |
| 7,515,981 B2 | 4/2009 | Ryznar et al. | |
| 8,069,953 B2 * | 12/2011 | Sus | A47F 10/06 186/41 |

(Continued)

OTHER PUBLICATIONS

See definition of "scanner", Lexico powered by Oxford Dictionary (attached).*

(Continued)

*Primary Examiner* — Peter Ludwig
(74) *Attorney, Agent, or Firm* — Sheridan Ross P.C.

(57) ABSTRACT

A make line for preparing food in a restaurant includes ingredient containers and food preparation stations. The make line is provided with a line level lighting system that illuminates one or more ingredient containers as well as one or more of the food preparation stations to indicate which ingredient(s) are to be added to the food order being prepared at the illuminated food preparation station(s). The make line may also comprise an overhead lighting system to selectively illuminate a heating surface, a scanner for detecting which order is currently being prepared, a sensor system for detecting which ingredient container(s) are being accessed, a label printer for printing a label for a given order, and other features to enhance the efficiency of the make line.

7 Claims, 19 Drawing Sheets

(56) References Cited

U.S. PATENT DOCUMENTS

| | | | | |
|---|---|---|---|---|
| 8,252,353 | B2* | 8/2012 | Hrudka | G06Q 10/087 312/140.2 |
| 8,383,177 | B2 | 2/2013 | Marsden et al. | |
| 2004/0208961 | A1 | 10/2004 | Reckert et al. | |
| 2005/0059414 | A1* | 3/2005 | Mahmoodi | G06Q 30/02 455/456.2 |
| 2010/0033341 | A1* | 2/2010 | Ishida | G06Q 10/08 340/8.1 |
| 2010/0121482 | A1* | 5/2010 | Jackson | G06Q 10/087 700/217 |
| 2011/0256292 | A1* | 10/2011 | Purgatorio | A47J 47/01 426/549 |
| 2013/0183420 | A1 | 7/2013 | Shimek et al. | |
| 2015/0025671 | A1* | 1/2015 | Assar | G06Q 10/063 700/117 |
| 2015/0187234 | A1* | 7/2015 | Atkinson | G06K 19/06028 40/5 |
| 2017/0323375 | A1* | 11/2017 | Slater | A61B 5/0484 |

OTHER PUBLICATIONS

Hsu et al. "Effect of High Pressure Processing on the survival of Shiga Toxin-Producing *Escherichia coli* (Big Six vs. O157:H7) in ground beef," Food Microbiology, 2015, vol. 48, pp. 1-7.

Jofre et al. "Inhibition of *Salmonella* sp. Listeria monocytogenes and *Staphylococcus aureus* in cooked ham by combining antimicrobials, high hydrostatic pressure and refrigeration," Meat Science, 2008, vol. 78, pp. 53-59.

Lowder et al. "High pressure-low temperature processing of beef: Effects on survival of internalized *E. coli* O157:H7 and quality characteristics," Innovative Food Science and Emerging Technologies, 2014, vol. 26, pp. 18-25.

Maitland et al. "High hydrostatic pressure processing reduces Salmonella enterica serovars in diced and whole tomatoes," International Journal of Food Microbiology, 2011, vol. 149, pp. 113-117.

Marcos et al. "Combined effect of natural antimicrobials and high pressure processing to prevent Listeria monocytogenes growth after a cold chain break during storage of cooked ham," Food Control, 2008, vol. 19, pp. 76-81.

Marcos et al. "High-pressure processing and antimicrobial biodegradable packaging to control Listeria monocytogenes during storage of cooked ham," Food Microbiology, 2008, vol. 25, pp. 177-182.

Sheen et al. "Inactivation of *Salmonella* spp. in ground chicken using high pressure processing," Food Control, 2015, vol. 57, pp. 41-47.

Smelt "Recent advances in the microbiology of high pressure processing," Trends in Food Science & Technology, 1998, vol. 9, pp. 152-158.

* cited by examiner

MAKE LINE OPTIMIZATION

CROSS-REFERENCE TO RELATED APPLICATIONS

This application claims the benefit, under 35 U.S.C. § 119(e), of U.S. Provisional Patent Application No. 62/351,650, entitled "Make Line Optimization" and filed on Jun. 17, 2016, which is hereby incorporated herein by reference in its entirety and for all purposes.

FIELD

The present disclosure is generally related to optimizing the efficiency of food preparation lines.

BACKGROUND

Many fast food and fast casual restaurants use assembly lines or "make lines" to prepare food. Some employ multiple make lines, one of which may include a customer-facing make line and another of which may include a non-customer facing drive-through, take-out, or to-go make line. Make lines typically include one or more food preparation surfaces as well as one or more ingredient containers. A make line may be configured with one or multiple stations to accommodate one or multiple assembly workers. Customer orders are written or printed on chits in the order they are received, and the chits are posted in a location where assembly workers on the make line can see what products to prepare and with which ingredients or components. In more modern make lines, customer orders are displayed on one or more screens positioned above the make line or in another location visible to assembly workers. The assembly workers can then refer to the screens to determine what products to prepare and with which ingredients or components.

United States Patent Application Publication No. 2004/0208961 describes a fast-food sandwich preparation kitchen arrangement intended to facilitate a combination of batch preparation and storage of fast-food sandwich components and made-to-order assembly of fast-food sandwiches, and is hereby incorporated herein in its entirety for all that it teaches and for all purposes. U.S. Pat. No. 7,515,981 and United States Patent Application Publication No. 2009/0121168 describe a light-guided assembly system adapted to provide visual indicators to an individual to guide sequential actions at a work location, and are hereby incorporated herein in their entirety for all that they teach and for all purposes.

SUMMARY

According to at least one embodiment of the present disclosure, a make line comprises a heating surface comprising a plurality of heating stations; a product preparation surface comprising a plurality product preparation stations; a plurality of ingredient containers proximate the product preparation surface; a line level lighting system; an overhead lighting system; an order identification reader system; a sensor network; a label printer configured to print a label and, upon removal of the label from the label printer, generate a completion signal; a cashier terminal comprising a graphical user interface; and an order server.

In the at least one embodiment, the line level lighting system comprises a plurality of ingredient lights, at least one ingredient light positioned adjacent each one of the plurality of ingredient containers; a plurality of target lights, at least one target light positioned adjacent each one of the plurality of product preparation stations; and a line level lighting system controller comprising an ingredient light interface, a target light interface, a first processor, and a first memory storing first instructions for execution by the first processor that, when executed by the first processor, cause the first processor to generate and transmit signals for selectively operating the plurality of ingredient lights and the plurality of target lights.

The overhead lighting system of the at least one embodiment comprises at least one overhead illumination device positioned above the heating surface and configured to selectively illuminate at least one of the heating stations; and an overhead lighting system controller comprising an illumination device interface, a second processor, and a second memory storing instructions for execution by the second processor that, when executed by the second processor, cause the second processor to generate and transmit signals for selectively operating the at least one illumination device.

The order identification reader system of the at least one embodiment comprises at least one scanner; and an order identification reader comprising a scanner interface, a third processor, and a third memory, the third memory storing instructions for execution by the third processor that, when executed by the third processor, cause the third processor to receive scanned information from the scanner and transmit an identification signal corresponding to the scanned information.

The sensor network of the at least one embodiment comprises at least one sensor positioned proximate to at least one of the plurality of ingredient containers and configured to generate a first access signal when the ingredient container is accessed; and a sensor network controller comprising a sensor interface, a fourth processor, and a fourth memory, the fourth memory storing instructions for execution by the fourth processor that, when executed by the fourth processor, cause the fourth processor to receive the first access signal via the sensor interface and generate, in response to receipt of the first access signal, a second access signal.

The order server of the at least one embodiment comprises a line-level lighting system interface; an overhead lighting system interface; an order identification reader system interface; a sensor network interface; a cashier terminal interface; a server network interface; a fifth processor; and a fifth memory. The fifth memory stores instructions for execution by the fifth processor that, when executed by the fifth processor, cause the fifth processor to receive order information from at least one of the cashier terminal via the cashier terminal interface, or a wide area network via the server network interface, the order information corresponding to at least one order; transmit a first instruction signal to the line-level lighting system via the line-level lighting system interface, the first instruction signal comprising first instructions for selective operation of the plurality of ingredient lights and the plurality of target lights based on the order information; transmit a second instruction signal to the overhead lighting system via the overhead lighting system interface, the second instruction signal comprising second instructions for selective operation of the at least one illumination device based on the order information; receive the identification signal from the order identification reader via the order identification reader system interface; receive the second access signal from the sensor network controller via the sensor network interface; in response to at least one of the identification signal and the second access signal, transmit a third instruction signal to the line-level lighting system controller via the line-level lighting system interface, the third instruction signal comprising third instructions for selective operation of the plurality of ingredient lights and the plurality of target lights, the third instructions different than the first instructions; in response to at least one of the identification signal and the second access signal, transmit a fourth instruction signal to the overhead lighting system via the overhead lighting system interface, the fourth instruction signal comprising fourth instructions for selective operation of the at least one illumination device, the fourth instructions different than the second instructions; transmit a printing signal to the label printer, the printing signal causing the label printer to print a label for the at least one order; receive the completion signal from the label printer; and in response to the completion signal, transmit an order complete signal via at least one of the cashier terminal interface and the network interface.

According to one embodiment of the present disclosure, a make line comprises: a heating surface comprising a plurality of heating stations; a product preparation surface comprising a plurality product preparation stations; a plurality of ingredient containers proximate the product preparation surface; and a line level lighting system. The line level lighting system comprises: a plurality of ingredient lights, at least one ingredient light positioned adjacent each one of the plurality of ingredient containers; a plurality of target lights, at least one target light positioned adjacent each one of the plurality of product preparation stations; and a line level lighting system controller comprising an ingredient light interface, a target light interface, a first processor, and a first memory storing first instructions for execution by the first processor that, when executed by the first processor, cause the first processor to generate and transmit signals for selectively operating the plurality of ingredient lights and the plurality of target lights.

The make line may further comprise an overhead lighting system comprising: at least one overhead illumination device positioned above the heating surface and configured to selectively illuminate at least one of the heating stations; and an overhead lighting system controller comprising an illumination device interface, a second processor, and a second memory storing second instructions for execution by the second processor that, when executed by the second processor, cause the second processor to generate and transmit signals for selectively operating the at least one illumination device.

The make line may further comprise an order identification reader system comprising: at least one scanner; and an order identification reader comprising a scanner interface, a third processor, and a third memory, the third memory storing third instructions for execution by the third processor that, when executed by the third processor, cause the third processor to receive scanned information from the scanner and transmit an identification signal corresponding to the scanned information.

The make line may further comprise a sensor network comprising: at least one sensor positioned proximate to at least one of the plurality of ingredient containers and configured to generate a first access signal when the ingredient container is accessed; and a sensor network controller comprising a sensor interface, a fourth processor, and a fourth memory, the fourth memory storing fourth instructions for execution by the fourth processor that, when executed by the fourth processor, cause the fourth processor to receive the first access signal via the sensor interface and generate, in response to receipt of the first access signal, a second access signal.

The make line may further comprise a label printer configured to print a label and, upon removal of the label from the label printer, to generate a completion signal. The make line may further comprise a cashier terminal comprising a graphical user interface. The make line may further comprise an order server comprising a line-level lighting system interface, a fifth processor, and a fifth memory, the fifth memory storing fifth instructions for execution by the fifth processor that, when executed, cause the fifth processor to transmit a first instruction signal to the line-level lighting system via the line-level lighting system interface, the first instruction signal comprising first instructions for selective operation of the plurality of ingredient lights and the plurality of target lights.

According to another embodiment of the present disclosure, a method of operating a make line, comprises: receiving, at a processor of an order server, order information from at least one of a cashier terminal and a wide area network, the order information corresponding to at least one order; and transmitting, to a line-level lighting system comprising a plurality of ingredient lights and a plurality of target lights, a first instruction signal comprising first instructions for selective operation of the plurality of ingredient lights and the plurality of target lights, the first instructions based on the order information.

The method of may further comprise transmitting, to an overhead lighting system comprising at least one illumination device, a second instruction signal comprising second instructions for selective operation of the at least one illumination device based on the order information. The method may further comprise receiving, at the processor and from an order identification reader system comprising at least one scanner, an identification signal; and, in response to the identification signal, transmitting, to the line-level lighting system, a third instruction signal comprising third instructions for selective operation of the plurality of ingredient lights and the plurality of target lights, the third instructions different than the first instructions.

The method may further comprise, in response to the identification signal, transmitting to the overhead lighting system a fourth instruction signal comprising fourth instructions for selective operation of the at least one illumination device, the fourth instructions different than the second instructions.

The method may further comprise receiving, at the processor and from a sensor network comprising at least one sensor positioned proximate to at least one of the plurality of ingredient containers and configured to generate a first access signal when the ingredient container is accessed, a second access signal corresponding to the first access signal; and, in response to the second access signal, transmitting, to the line-level lighting system, a third instruction signal comprising third instructions for selective operation of the plurality of ingredient lights and the plurality of target lights, the third instructions different than the first instructions.

The method may further comprise, in response to the second access signal, transmitting to the overhead lighting system a fourth instruction signal comprising fourth instructions for selective operation of the at least one illumination device, the fourth instructions different than the second instructions. The method may further comprise transmitting a printing signal to a label printer, the printing signal causing the label printer to print a label for the at least one order. The method may further comprise receiving, at the processor and from the label printer, a completion signal; and, in response to the completion signal, transmitting an order complete signal to at least one of the cashier terminal and the wide area network.

According to yet another embodiment of the present disclosure, a make line comprises: a product preparation surface comprising a plurality product preparation stations; a plurality of ingredient containers proximate the product preparation surface; a line level lighting system, and an order server. The line level lighting system comprises a plurality of ingredient lights, at least one ingredient light positioned adjacent each one of the plurality of ingredient containers; and a plurality of target lights, at least one target light positioned adjacent each one of the plurality of product preparation stations. The order server comprises a processor; and a memory, the memory storing instructions for execution by the processor that, when executed by the processor, cause the processor to: receive order information from at least one of a cashier terminal and a wide area network, the order information corresponding to at least one order; and transmit a first instruction signal to the line-level lighting system, the first instruction signal comprising first instructions for selective operation of the plurality of ingredient lights and the plurality of target lights based on the order information.

The make line may further comprise a heating surface comprising a plurality of heating stations, and an overhead lighting system comprising at least one overhead illumination device positioned above the heating surface and configured to selectively illuminate at least one of the heating stations. The memory may store additional instructions for execution by the processor that, when executed, further cause the processor to: transmit a second instruction signal to the overhead lighting system via the overhead lighting system interface, the second instruction signal comprising second instructions for selective operation of the at least one illumination device based on the order information.

The make line may further comprise at least one sensor positioned proximate to at least one of the plurality of ingredient containers and configured to generate an access signal when the ingredient container is accessed. The memory may store additional instructions for execution by the processor that, when executed, further cause the processor to: receive the access signal from the at least one sensor.

The memory may store additional instructions for execution by the processor that, when executed, further cause the processor to: transmit, to the line-level lighting system, a third instruction signal comprising third instructions for selective operation of the plurality of ingredient lights and the plurality of target lights, the third instructions different than the first instructions.

The make line may further comprise a label printer configured to print a label and, upon removal of the label from the label printer, generate a completion signal. The memory may store additional instructions for execution by the processor that, when executed, further cause the processor to transmit a printing signal to the label printer, the printing signal causing the label printer to print a label for the at least one order; receive the completion signal from the label printer; and, in response to the completion signal, transmit an order complete signal to at least one of the cashier terminal and the wide area network.

The present disclosure includes many other embodiments, aspects and features of which are described in greater detail below.

The terms "memory," "computer memory," and "computer-readable medium," as used herein, refer to any tangible data storage medium that participates in providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, an EEPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations and aspects of the present disclosure are stored.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

A processor as used in embodiments of the present disclosure may correspond to one or many microprocessors that are contained within a common housing, circuit board, or blade with the memory. The processor may be a multi-purpose, programmable device that accepts digital data as input, processes the digital data according to instructions stored in its internal memory, and provides results as output. The processor may implement sequential digital logic as it has internal memory. As with most microprocessors, the processor may operate on numbers and symbols represented in the binary numeral system. The processor may be or include, without limitation, any one or more of a Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Examples provided throughout the present disclosure (which may be, but need not be, denoted with "for example," "by way of example," "e.g.," or any other term or phrase suggesting that an example is being or will be described) are intended to illustrate one or more embodiments of the present disclosure, and are not given by way of limitation.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
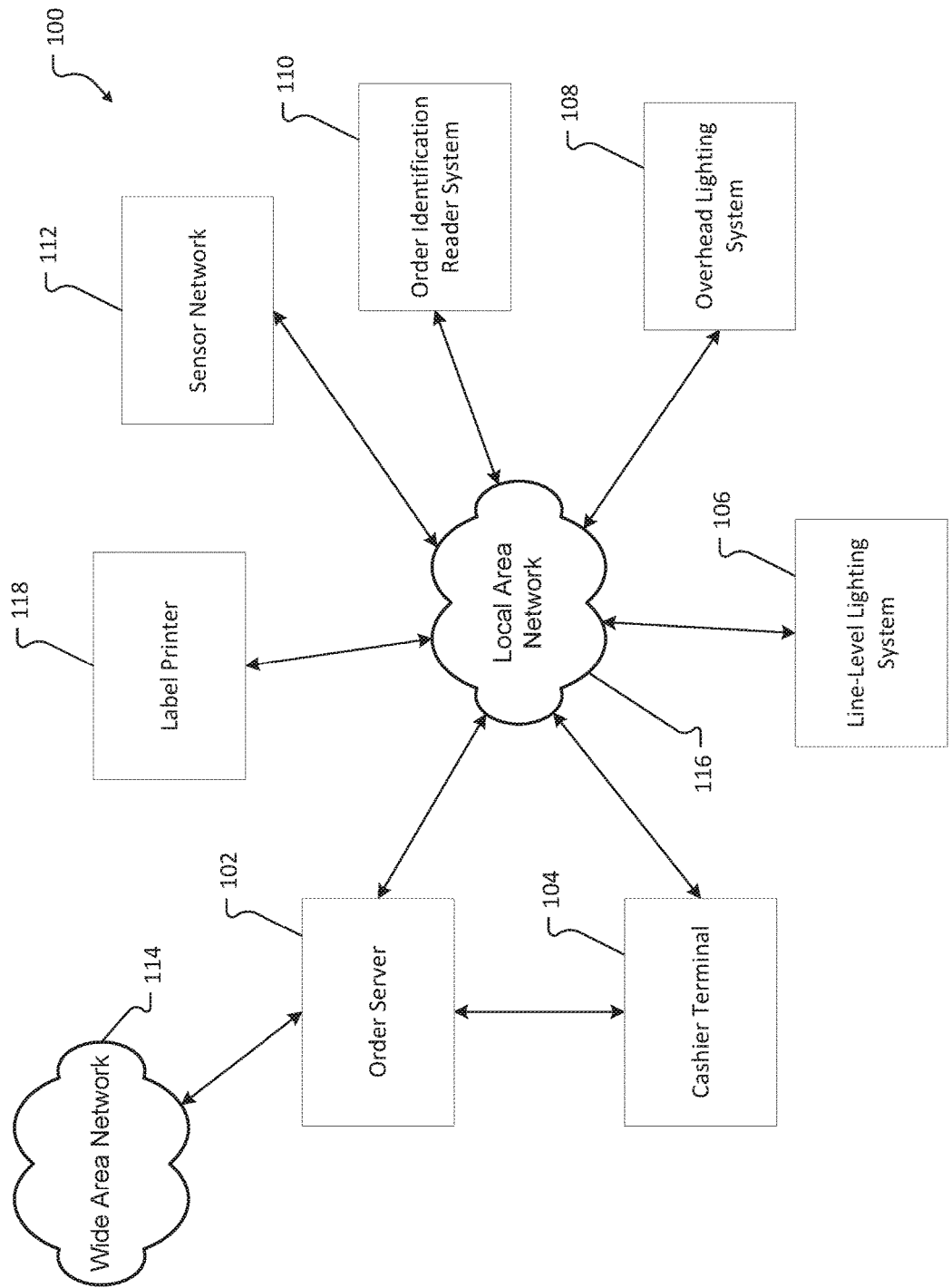
FIG. 1 is a diagram of a system according to embodiments of the present disclosure.

Turning first to FIG. 1, an optimized make line system 100 comprises an order server 102 that may be connected to a wide area network 114, from which it may receive orders from remote customers. The order server 102 may be operatively connected with a cashier terminal 104, through which a cashier or other operator can input orders to the order server. The order server may also be in operable communication with, whether directly or via a local area network 116, a line-level lighting system 106, an overhead lighting system 108, an order identification reader system 110, a sensor network 112, and a label printer 118. As described more fully below, the order server 102 may analyze orders received from the wide area network 114 or from the cashier terminal 104 to determine which components are needed for each order (or, for multi-product orders, which components are needed for each product of each order), as well as to determine a hierarchy of assembly for multiple pending orders. The order server 102 then communicates with the line-level lighting system 106, the overhead lighting system 108, the order identification reader system 110, and the sensor network 112 to cause these elements to provide a make line operator with properly sequenced indications regarding, for example, which components to combine to properly build the ordered products. The order server 102, the sensor network 112, and/or the order identification reader system 110 may also communicate with the label printer 118 to print the correct label for each product as it is completed. Completed and labeled products may then be delivered to the customer(s) who ordered the products.

Figure 2A:
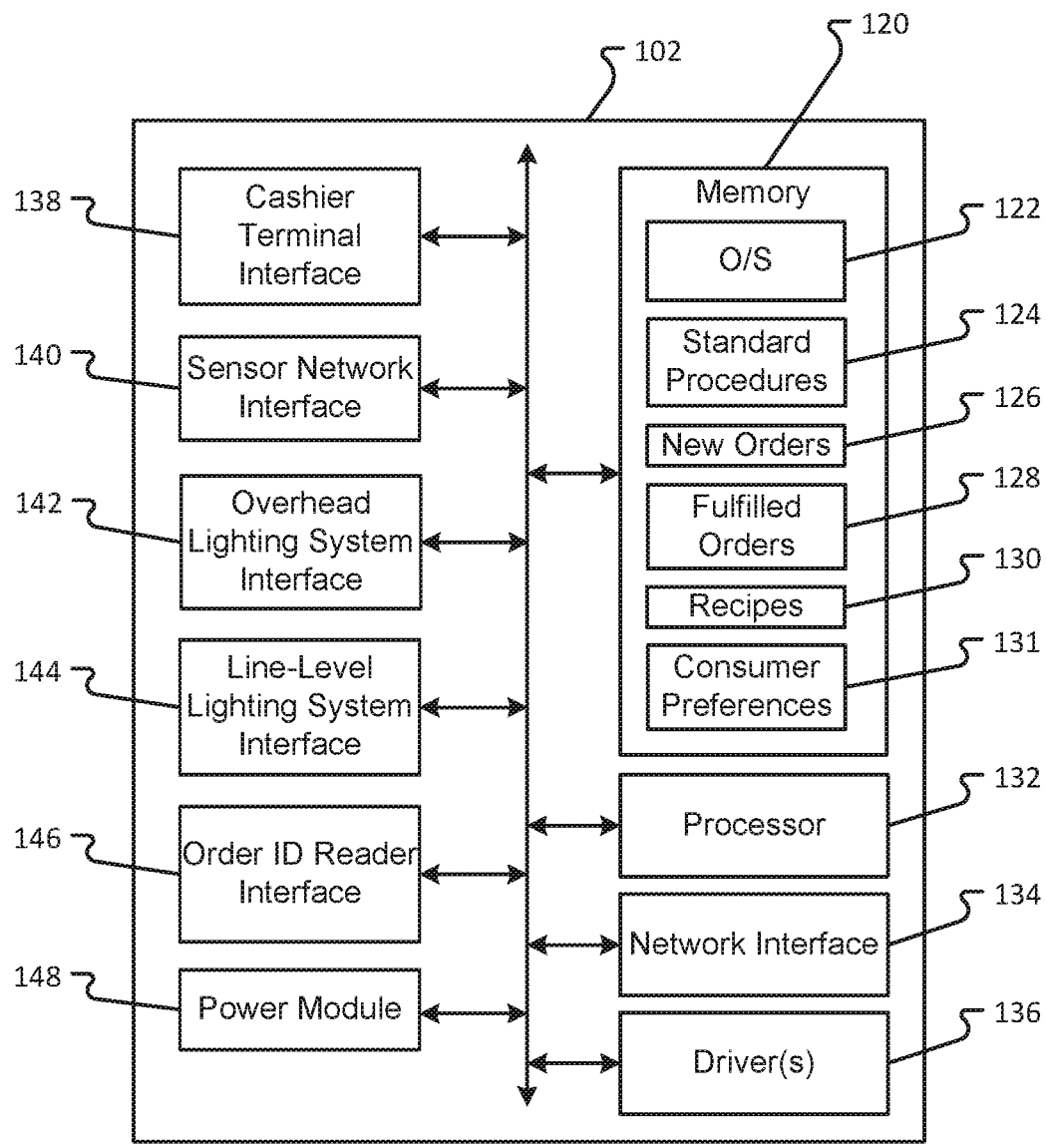
FIG. 2A is a block diagram of a device according to at least one embodiment of the present disclosure.

As depicted in FIG. 2A, an order server 102 according to embodiments of the present disclosure may comprise a memory 120, which may store, among other things, an operating system 122, standard make line procedures 124, new (e.g. unfulfilled) order information 126, fulfilled order information 128, recipe information 130, and consumer preferences 131. The order server 102 may also comprise a processor 132, a network interface 134, one or more drivers 136, a cashier terminal interface 138, a sensor network interface 140, an overhead lighting system interface 142, a line-level lighting system interface 144, an order ID reader interface 146, and a power module 148. In at least one embodiment, the order server 102 may send and receive signals to and from the sensor network 112, the order identification reader system 110, the overhead lighting system 108, and the line-level lighting system 106 via the network interface 134 (e.g. over a local area network 116), in which embodiments the specific interfaces 140, 142, 144, and 146 may not be included in the order server 102.

The memory 120 as used in embodiments of the present disclosure may correspond to any type of non-transitory computer-readable medium. In at least one embodiment, the memory 120 may comprise volatile or non-volatile memory and a controller for the same. Non-limiting examples of a memory 120 that may be utilized in an order server 102 include a portable computer diskette, a hard disk, a random access memory (RAM) (including any variety of random access memory, such as dynamic RAM (DRAM) and static RAM (SRAM)), a read-only memory (ROM), an erasable programmable read-only memory (EPROM or EEPROM or Flash memory), an optical fiber, a portable compact disc read-only memory (CD-ROM), an optical storage device, a magnetic storage device, or any suitable combination of the foregoing. The memory may store one or more operating systems, applications, or other programs, and may also store various kinds of information. For example, the memory may store an operating system 122. Operating systems are well known and any suitable operating system may be used within the scope of the present disclosure.

Figure 2B:
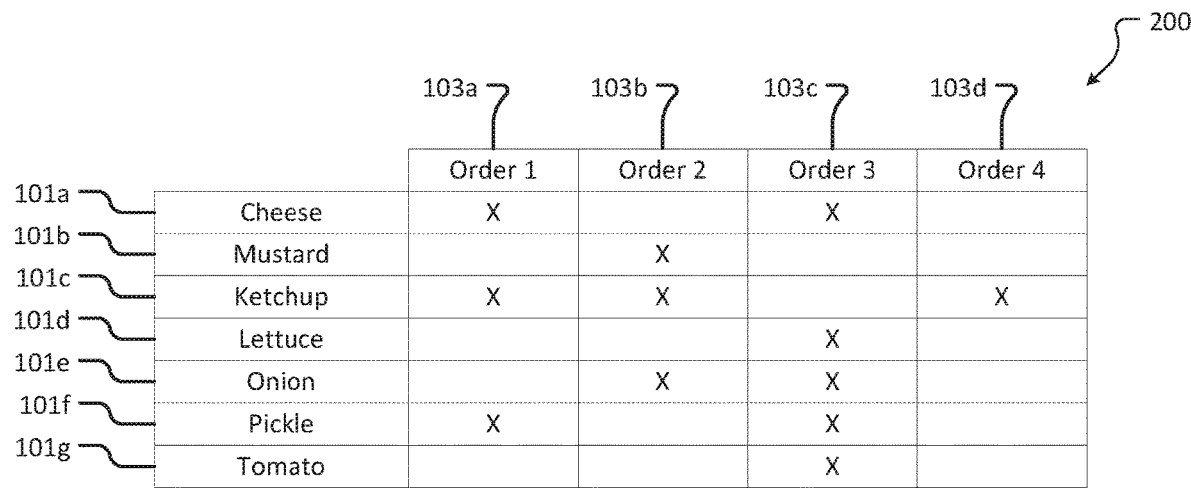
FIG. 2B is a table that may be utilized in accordance with at least one embodiment of the present disclosure.

The memory may also store standard procedures 124, which may include such information as a set of standard components or ingredients, a standard order or sequence in which the set of standard components or ingredients should be applied, and one or more algorithms for evaluating unfulfilled orders and generating a process or sequence in which the ordered products should be built or made. For example, the standard procedures 124 may maintain a table or other database 200 as shown in FIG. 2B comprising a separate row 101 for each standard ingredient. The standard procedures 124 may further comprise instructions for causing the processor 132 to add one new column 103 to the table or other database 200 for each newly ordered product, and to populate the cells of each column 103 with an "X" or other marker in the row 101 corresponding to each standard ingredient to be included in the ordered product. For example, an order server 102 in an establishment selling hamburgers may have stored in a memory 120 thereof a table 200 identifying cheese, mustard, ketchup, lettuce, onion, pickle, and tomato as standard ingredients in rows 101*a* through 101*g*. When a first new order arrives for a hamburger with cheese, ketchup, and pickle, the processor 132 may execute instructions stored within the standard procedures 124 that cause the processor 132 to add a column 103*a* to the table 200, and to populate the cells of the column 103*a* with an indication in the rows 101*a*, 101*c*, and 101*f* corresponding to cheese, ketchup, and pickle, respectively. When a second new order arrives, for a hamburger with mustard, ketchup, and onion, the processor 132 may execute instructions stored within the standard procedures 124 that cause the processor 132 to add a column 103*b* to the table 200, and to populate the cells of the column 103*b* with an indication in the rows 101*b*, 101*c*, and 101*e* corresponding to mustard, ketchup, and onion, respectively. The same process may be followed for a third order for a hamburger having cheese, lettuce, onion, pickle, and tomato, and for a fourth order for a hamburger having only ketchup. The order server 102 may then send signals to the line-level lighting system 106 and the overhead lighting system 108 based on the indications in the table 200, and columns corresponding to fulfilled orders may be removed from the table 200.

The memory 120 may also store new order information 126. The new order information 126 may comprise, for example, a table or other database correlating an order number and/or other order identification information with each product included in the order. The order information 126 may further store information about requested customizations of each product included in the order. For example, if ketchup is an ingredient in a product referred to as the "Super Hamburger," but a customer orders a Super Hamburger without ketchup, then the new order information 126 may reflect that the Super Hamburger for the order in question should be made without ketchup.

The memory 120 may further store fulfilled order information 128. The fulfilled order information 128 may be stored solely for archival and/or auditing purposes. Alternatively, the fulfilled order information 128 may be used by the order server 102 to predict when new components and/or ingredients will need to be ordered (e.g. based on the number of orders that have been fulfilled and that require a particular component and/or ingredient, and recipe information about the number and/or amount of each particular component and/or ingredient that is included in each ordered product). The fulfilled order information 128 may also be sent to remote food processing centers (e.g. via a wide area network 114) for use in predicting fulfillment requirements.

In some embodiments, the order server 102 may automatically place restocking orders with one or more predetermined merchants (e.g. via a wide area network 114). Also in some embodiments, the order server 102 may provide one or more notifications or indications—to a make line operator (whether via a line-level lighting system 106, an overhead lighting system 108, a label printer 118, or otherwise), a cashier using a cashier terminal 104, or any other predetermined party (e.g. via an automatically generated email, instant message, or telephone call)—that one or more components and/or ingredients may be or is running low, or that one or more ingredients may need to be or needs to be ordered. Also in some embodiments, the order server 102 may store ingredient or component expiration information in the memory 120 thereof, and may automatically order new ingredients and/or components when an existing stock of ingredients has expired or is about to expire. Additionally or alternatively, the order server 102 may provide one or more notifications or indications—to a make line operator (whether via a line-level lighting system 106, an overhead lighting system 108, a label printer 118, or otherwise), a cashier using a cashier terminal 104, or any other predetermined party (e.g. via an automatically generated email, instant message, or telephone call)—that one or more components and/or ingredients will soon be or is expired, or that one or more expired or soon-to-expire ingredients may need to be or needs to be ordered.

Figure 2C:
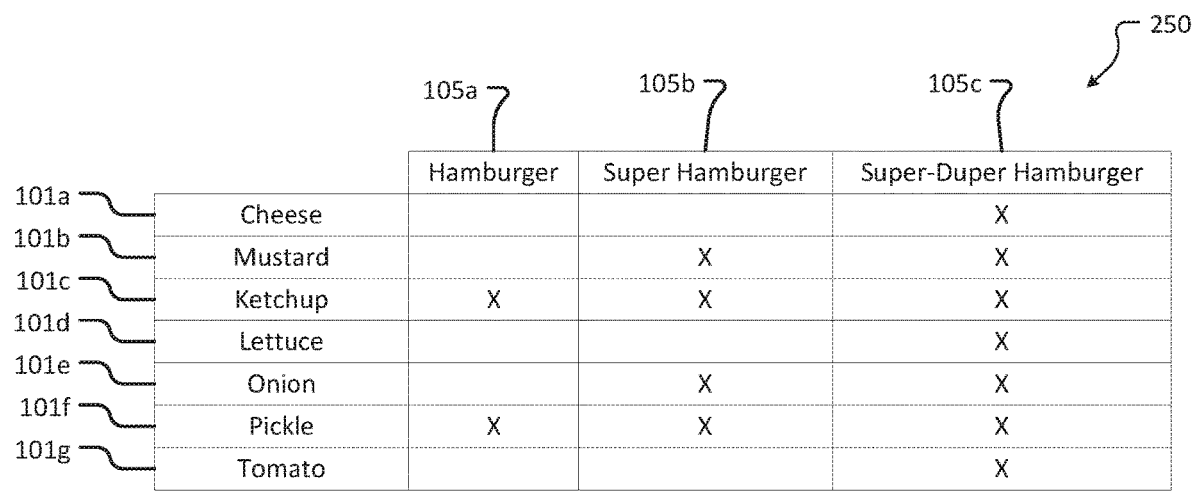
FIG. 2C is another table that may be utilized in accordance with at least one embodiment of the present disclosure.

The memory 120 may additionally store recipe information 130. The recipe information 130 may comprise a table or database 250 as shown in FIG. 2C that correlates each product that may be ordered by a customer with the standard components and/or ingredients of that product. For example, the memory 120 of an order server 102 used in an establishment that sells hamburgers may store, in the table 250, a recipe for a Simple Hamburger in a column 105a in which an indication has been made in each row 101 corresponding to a standard ingredient contained in the Simple Hamburger. Similarly, the table 250 may include a recipe for a Super Hamburger in a column 105b in which an indication has been made in each row 101 corresponding to a standard ingredient contained in the Simple Hamburger, and the table 250 may include a recipe for a Super-Duper Hamburger in a column 105c in which an indication has been made in each row 101 corresponding to a standard ingredient contained in the Super-Duper Hamburger. The recipe information 130 may then be referenced by the processor 132 in adding new columns to a table 200 for new orders. For example, when a new order is added to the stored new order information 126, the processor 132 may identify the products included in the new order information 126, obtain the recipe for each product included in the new order from the recipe information 130, then populate the appropriate cells of one or more new columns 103 corresponding to the new order with an indication of which standard ingredients are to be included in the ordered product(s). In at least one embodiment, the recipe information 130 may include information about the quantity of a particular component or ingredient to be included in a product, information about the proper order in which to assemble or combine the components or ingredients to make a particular product, information about the length of time for which a given component or ingredient should be processed in a given manner (e.g. heated, cooled, steamed, submerged, pressurized), and/or other information relevant to the preparation of a product (e.g. consumer preferences).

The memory 120 may also store consumer preferences 131. The consumer preferences 131 may comprise a table or database that correlates a unique identifier associated with each customer (e.g. a name, a phone number, an address, an email address, an assigned identifier, or any combination of the foregoing) with that customer's preferences. The order server 102 may extract consumer identification information from incoming orders and use that information to look up stored consumer preferences 131 corresponding to the consumer(s) who placed the order(s). The order server 102 may automatically add information about new consumers (e.g. consumers who do not correspond to any information in the stored consumer preferences 131) to the stored consumer preferences 131, and/or each consumer may be able to opt in and/or out of having his or her preferences stored in the consumer preferences 131. The consumer preferences 131 may be customizable by the consumer (e.g. via a web interface, a mobile app, or an in-store kiosk), or the consumer preferences 131 may be automatically determined based on the consumer's order history. Additionally, the consumer's preferences may be applied by default (e.g., if a consumer orders a hamburger and the consumer has stored consumer preferences 131 in the memory 120, then the order server 102 may automatically determine that the hamburger should be made according to the stored preferences), or the consumer's preferences may be applied only when requested or directed by the consumer. The consumer preferences may comprise information about a consumer's preferred products (e.g. the product or products that the consumer most often orders), and/or information about the consumer's preferred customization of one or more products (e.g. which ingredients or components the consumer prefers in or on a given product).

As referenced above, the order server 102 may also comprise a processor 132. The processor 132 may execute instructions stored within the memory 120, including instructions of the operating system 122 and/or the standard procedures 124. The processor 132 may provide processing functions for the cashier terminal 104, the line-level lighting system 106, the overhead lighting system 108, the order identification reader system 110, the sensor network 112, and/or the label printer 118, or one or more of the foregoing components may comprise a processor for providing any needed processing functions.

The order server 102 may further comprise a network interface 134. The network interface 134 (which may also be referred to as a communication interface) may comprise hardware that facilitates communications with other devices in the system 100, whether directly or via a local area network 116. The network interface 134 may further send and receive communications from a wide area network 114. The network interface 134 may include an Ethernet port, a Wi-Fi card, a Network Interface Card (NIC), a cellular interface (e.g., antenna, filters, and associated circuitry), or the like. The network interface 134 may be configured to establish and maintain a connection with one or more devices of the system 100, and/or with the wide area network 114. The network interface 134 may, for example, be configured to encode and decode communications (e.g., packets) according to a protocol utilized by the one or both of the wide area network 114 and the local area network 116.

The driver(s) 136 may correspond to hardware, software (including firmware), and/or controllers that provide specific instructions to hardware components of the order server 102, thereby facilitating their operation and/or the operation of associated hardware components. For instance, the network interface 134, the power module 148, the interfaces 138, 140, 142, 144, and 146, and/or the memory 120 may each have a dedicated driver 136 that provides appropriate control signals to effect its/their operation. The driver(s) 136 may also comprise the software or logic circuits that ensure the various hardware components are controlled appropriately and in accordance with desired protocols. For instance, the driver 136 of the network interface 134 may be adapted to ensure that the network interface 134 follows the appropriate network communication protocols (e.g., TCP/IP (at one or more layers in the OSI model), TCP, UDP, RTP, GSM, LTE, Wi-Fi, etc.) such that the network interface 134 can exchange communications via the wide area network 114 and/or the local area network 116. As can be appreciated, the driver(s) 136 may also be configured to control wired hardware components (e.g., a USB driver, an Ethernet driver, fiber optic communications, etc.). The driver(s) 136 may be stored in the memory 120 and/or in one or more memories associated with individual hardware components of the order server 102.

The order ID reader interface 146, the line-level lighting system interface 144, the overhead lighting system interface 142, the sensor network interface 140, and the cashier terminal interface 138 may each comprise hardware and/or software for enabling communications between the processor 132 of the order server 102 and a line level lighting system controller 300, an overhead lighting system controller 400, an order identification reader controller 500, a sensor network controller 600, and a cashier terminal 104, respectively. The enabled communications may occur over a local area network 116, as illustrated in FIG. 1, or they may occur over a direct connection between the order server 102 and the controllers 300, 400, 500, and 600 and the cashier terminal 104, respectively. The direct connection may be a wired connection or a wireless connection. When the direct connection is a wired connection, the interfaces 146, 144, 142, 140, and 138 may comprise the same or different physical connectors. For example, one or more of the interfaces 146, 144, 142, 140, and 138 may utilize an RJ45 connector, a VGA connector, an HDMI connecter, a DVI connector, a USB connector, a DB-25M connector, or a DE-9M connector. In at least one embodiment, one or more of the interfaces 146, 144, 142, 140, and 138 sends signals to and receives signals from the controllers 300, 400, 500, and 600 and/or the cashier terminal 104, respectively, via the network interface 136 rather than directly.

The power module 148 may include a built-in power supply (e.g., battery) and/or a power converter that facilitates the conversion of externally-supplied AC power into DC power that is used to power the various components of the order server 102. In at least one embodiment, the power module 148 may also include some implementation of surge protection circuitry to protect the components of the order server 102, or other associated hardware, from power surges.

A cashier terminal 104 according to embodiments of the present disclosure may simply be a graphical user interface (e.g. a computer monitor, television screen, laptop screen, tablet screen, smart phone screen, or the like, any one of which may be a resistive, capacitive, surface acoustic wave, or infrared touch screen, an LCD screen, an LED screen, a plasma screen, or a CRT screen) operably connected to the order server 102. The graphical user interface may display images based on signals generated by the order server 102, which images may be configured to facilitate the entry of customer orders by a cashier who receives the orders in person, via a wireless radio, over the phone, through text messaging, through instant messaging, and/or through email. In at least one embodiment, the cashier terminal 104 may be a stand-alone computing device comprising, for example, a processor, a memory, a network interface, and a graphical user interface. The network interface may be configured to interface with a network 114 or 116 or with another computing device (e.g. the order server 102) via a wired connection, a wireless connection, or both. In at least one embodiment, the cashier terminal may be a tablet, such as an Apple iPad, a Microsoft Surface, a Google Nexus, a Sony Xperia, a Dell Venue, a Samsung Galaxy Tab, or an Amazon Fire. Additionally, in at least one embodiment, the cashier terminal 104 may be operably connected to a cash drawer, a credit card reader, and/or other money- or financial-related hardware for receiving and/or storing payments.

Figure 3:
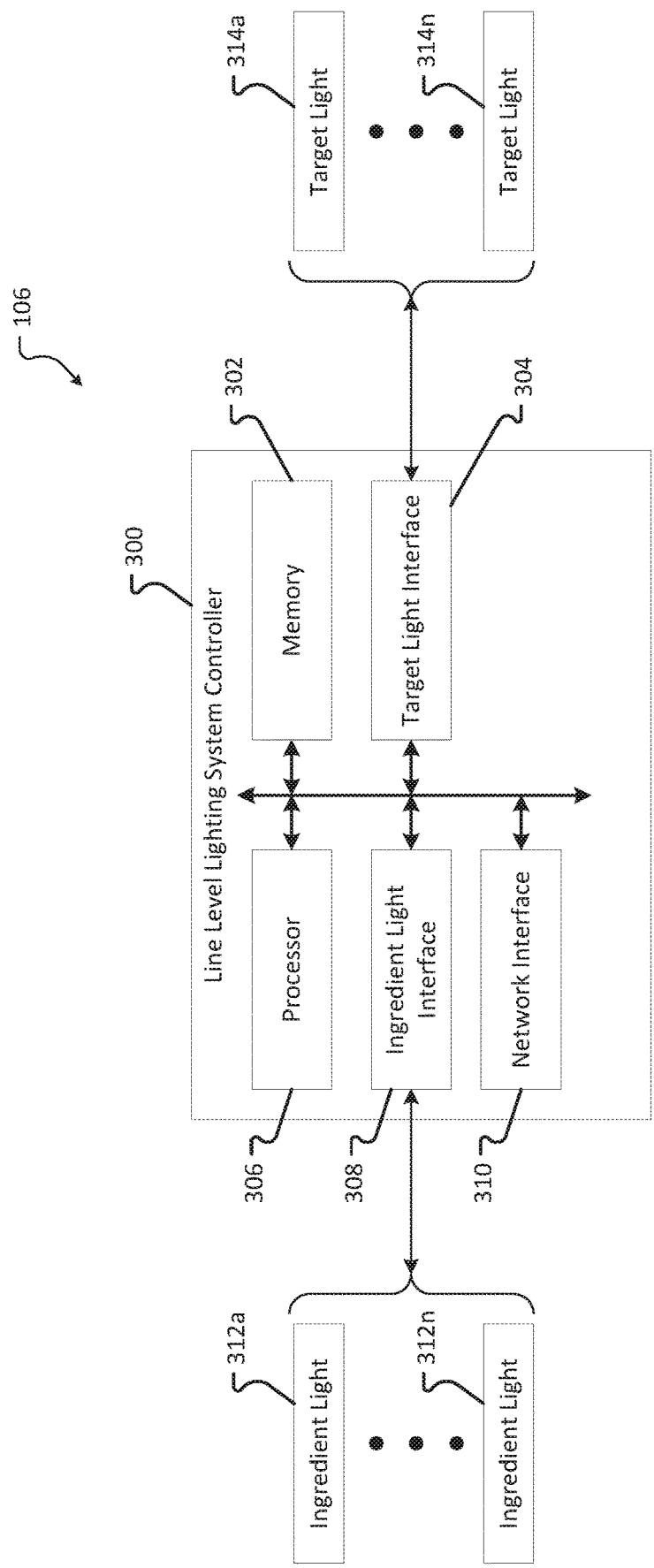
FIG. 3 is a block diagram of a system according to at least one embodiment of the present disclosure.

Turning now to FIG. 3, the line-level lighting system 106 may comprise a line level lighting system controller 300, a plurality of ingredient lights 312a-312n, and a plurality of target lights 314a-314n. The line level lighting system controller 300 may comprise a memory 302, a processor 306, and a network interface 310. The line level lighting system controller 300 may further comprise an ingredient light interface 308 and a target light interface 304. The various components of the line level lighting system controller operate together to turn on and off the plurality of ingredient lights 312a-312n and/or the plurality of target lights 314a-314n based on information provided by the order server 102, to guide a make line operator to select the proper ingredient or component and to apply it to the targets or products that need that ingredient or component.

The memory 302, like the memory 120 of the order server 102, may correspond to any type of non-transitory computer-readable medium. In at least one embodiment, the memory 302 may comprise volatile or non-volatile memory and a controller for the same. Non-limiting examples of a memory 302 include a portable computer diskette, a hard disk, a random access memory (RAM) (including any variety of random access memory, such as dynamic RAM (DRAM) and static RAM (SRAM)), a read-only memory (ROM), an erasable programmable read-only memory (EPROM or EEPROM or Flash memory), an optical fiber, a portable compact disc read-only memory (CD-ROM), an optical storage device, a magnetic storage device, or any suitable combination of the foregoing. The memory may store one or more operating systems, applications, or other programs, and may also store various kinds of information.

The processor 306 may be substantially the same as or similar to any other processor described herein.

The network interface 310 (which may also be referred to as a communication interface) may comprise hardware that facilitates communications with other devices in the system 100, whether directly or via a local area network 116. For example, communications sent to the line level lighting system 106 may be received, at least initially, by the network interface 310. Similarly, communications sent from the line level lighting system 106, and more specifically from the line-level lighting system controller 300, may be sent from or through the network interface 310. The network interface 310 may include an Ethernet port, a Wi-Fi card, a Network Interface Card (NIC), a cellular interface (e.g., antenna, filters, and associated circuitry), or the like. The network interface 310 may be configured to establish and maintain a connection with one or more devices and/or networks of the system 100. The network interface 310 may, for example, be configured to encode and decode communications (e.g., packets) according to a protocol utilized by a network over which the line level lighting system controller sends and receives communications (e.g. the local area network 116).

The ingredient light interface 308 may be any interface utilized to allow the processor 306 to communicate with and/or control the operation of the ingredient lights 312a-312n. The ingredient light interface 308 may receive signals from the processor 306 and send signals to the ingredient lights 312a-312n. The signals may be sent over a wired connection or over a wireless connection. In at least one embodiment, for example, each of one or more ingredient lights 312a-312n may have its own power source (e.g. an independent battery and/or an independent plug for connection to an electrical outlet) and its own wireless receiver for receiving signals from the controller 300, which may be equipped with a wireless transmitter. Use of wireless transmitters and receivers may be particularly useful for eliminating extensive wiring that might otherwise be needed in and around a make line, which wiring might interfere with preparation of ordered products on the make line. As another example, a line level lighting system 106 according to at least one embodiment may utilize a wired connection between the controller 300 and the ingredient lights 312a-312n, which wired connection may or may not provide power to the ingredient lights 312a-312n. Use of wired connections between the controller 300 and the ingredient lights 312a-312n may be particularly useful for enhancing reliability and reducing cost, and may also be useful in environments where wireless interference would or could disrupt wireless signals. The ingredient light interface 308 may comprise hardware that includes one or more ports or receptacles for receiving one or more wires connected to the ingredient lights 312a-312n. The ingredient light interface 308 may include one or more physical or digital switches, and may further include, for example, one or more transformers, amplifiers, filters, analog-to-digital converters, digital-to-analog converters, and/or transistors.

Similarly, the target light interface 304 may be any interface utilized to allow the processor 306 to communicate with and/or control the operation of the target lights 314a-314n. The target light interface 304 may receive signals from the processor 306 and send signals to the target lights 314a-314n. As discussed above with respect to the ingredient lights 312a-312n, the signals may be sent over a wired connection or over a wireless connection. In at least one embodiment, for example, each of one or more target lights 314a-314n may have its own power source (e.g. an independent battery and/or an independent plug for connection to an electrical outlet) and its own wireless receiver for receiving signals from the controller 300, which may be equipped with a wireless transmitter. As another example, a line level lighting system 106 according to at least one embodiment may utilize a wired connection between the controller 300 and the target lights 314a-314n, which wired connection may or may not provide power to the target lights 314a-314n. The benefits of wired and wireless connections discussed above with respect to the ingredient lights 312a-312n apply with respect to the target lights 314a-314n as well. Based on the foregoing disclosure, persons of ordinary skill in the art will recognize that wired and/or wireless connections may be utilized for other systems and devices described herein as well.

The target light interface 304 may comprise hardware that includes one or more ports or receptacles for receiving one or more wires connected to the ingredient lights 314a-314n. The target light interface 304 may include one or more physical or digital switches, and may further include, for example, one or more transformers, amplifiers, filters, analog-to-digital converters, digital-to-analog converters, and/or transistors.

The ingredient lights 312a-312n may comprise LED lights, fluorescent lights, incandescent lights, or any other type of light source. The ingredient lights 312a-312n may be any color of light, and may be multiple light sources for emitting different colors of light and/or may be single light sources capable of emitting multiple colors of light. The ingredient lights 312a-312n are arranged on or in the make line and are each positioned to correspond to an ingredient or component. In at least one embodiment, only one ingredient light 312 corresponds to each ingredient or component. In other embodiments, a plurality of ingredient lights 312 correspond to each ingredient or component. The ingredient lights 312 may be selectively turned on or illuminated based on a signal from the ingredient light interface 308 to indicate to a make line operator which ingredient to use at any given time. For example, an ingredient light 312 positioned adjacent a ketchup dispenser may be illuminated to indicate to a make line operator that he or she should use the ketchup. In one embodiment of the present disclosure in which a plurality of ingredient lights 312 correspond to each ingredient or component, one or more of the plurality of lights 312 may be selectively illuminated to indicate how much of a given ingredient, or how many of a given component, to apply to a product. For example, if three ingredient lights 312 are positioned adjacent a ketchup dispenser, then one ingredient light 312 may be illuminated to indicate that the make line operator should "go easy" when applying the ketchup to the product (e.g., apply a relatively small amount of ketchup to the product); two ingredient lights 312 may be illuminated to indicate that the make line operator should apply a normal amount of ketchup to the product; and three ingredient lights 312 may be illuminated to indicate that the make line operator should "go heavy" on the ketchup (e.g. apply a relative large amount of ketchup to the product). Thus, the use of multiple ingredient lights 312 per ingredient or component may beneficially allow for greater customization of each product based on customer preferences as expressed in an order or as stored in the memory 120. Alternatively, a single ingredient light 312 may be selectively illuminated by intensity or flashing/not flashing to indicate how much of a given ingredient, or how many of a given component, to apply to a product.

The target lights 314a-314n may comprise LED lights, fluorescent lights, incandescent lights, or any other type of light source. The ingredient lights 312a-312n may be any color of light, and may be multiple light sources for emitting different colors of light and/or may be single light sources capable of emitting multiple colors of light. The target lights 314a-314n are arranged on or in the make line and are each positioned to correspond to a product preparation station. The target lights 314a-314n are beneficial in embodiments of the present disclosure adapted to guide a make line operator preparing multiple products in parallel (e.g. simultaneously), but may not be needed or included in embodiments of the present disclosure adapted to guide a make line operator preparing products in series (e.g. one product after another).

In at least one embodiment, only one target light 314 corresponds to each station. In other embodiments, a plurality of target lights 314 correspond to each station. The target lights 314 may be selectively turned on or illuminated based on a signal from the target light interface 304 to indicate to a make line operator which targets or products should receive a given ingredient. For example, on a make line having eight stations (arranged to be used in parallel), a target light 314 may be positioned adjacent to each station. Then, as the make line operator applies different ingredients or components, different target lights may be turned on or illuminated to guide the make line operator in applying the ingredient or component to the proper targets or products. Thus, if the make line is configured for assembling hamburgers, then the target lights 314 corresponding to the stations of hamburgers that should receive ketchup may be illuminated when the make line operator is dispensing ketchup; the target lights 314 corresponding to the stations of hamburgers that should receive tomatoes may be illuminated when the make line operator is distributing tomatoes; the target lights 314 corresponding to the stations of hamburgers that should receive onions may be illuminated when the make line operator is dispensing onions; and so forth.

In one embodiment of the present disclosure in which a plurality of target lights 314 correspond to each station, one or more of the plurality of target lights 314 may be selectively illuminated to indicate how much of a given ingredient, or how many of a given component, to apply to the product in the corresponding station. For example, if three target lights 314 are positioned adjacent each station, then one target light 314 may be illuminated to indicate that the make line operator should "go easy" when applying the current ingredient to the product (e.g., if the ingredient currently being applied is ketchup, that the make line operator should apply a relatively small amount of ketchup to the product); two target lights 314 may be illuminated to indicate that the make line operator should apply a normal amount of the ingredient to the product (e.g. a normal amount of ketchup); and three target lights 314 may be illuminated to indicate that the make line operator should "go heavy" on the ingredient (e.g. apply a relative large amount of ketchup to the product). Thus, the use of multiple target lights 314 per ingredient or component may beneficially allow for greater customization of each product based on customer preferences as expressed in an order or as stored in the memory 120. Alternatively, a single target light 314 may be selectively illuminated by intensity or flashing/not flashing to indicate how much of a given ingredient, or how many of a given component, to apply to a product.

In at least one embodiment, a make line may be configured with multiple ingredient lights 312 per ingredient or component and/or with multiple target lights 314 per station, and the multiple ingredient lights 312 and/or multiple target lights 314 may be used to indicate the number of a given ingredient or component to add to the product (e.g. one light for one hamburger patty, two lights for two hamburger patties, etc). In still further embodiments, whether the multiple ingredient lights 312 and/or target lights 314 refer to a relative quantity (e.g. for ketchup) or a relative number (e.g. for hamburger patties) depends on the ingredient or component currently being applied.

Figure 4:
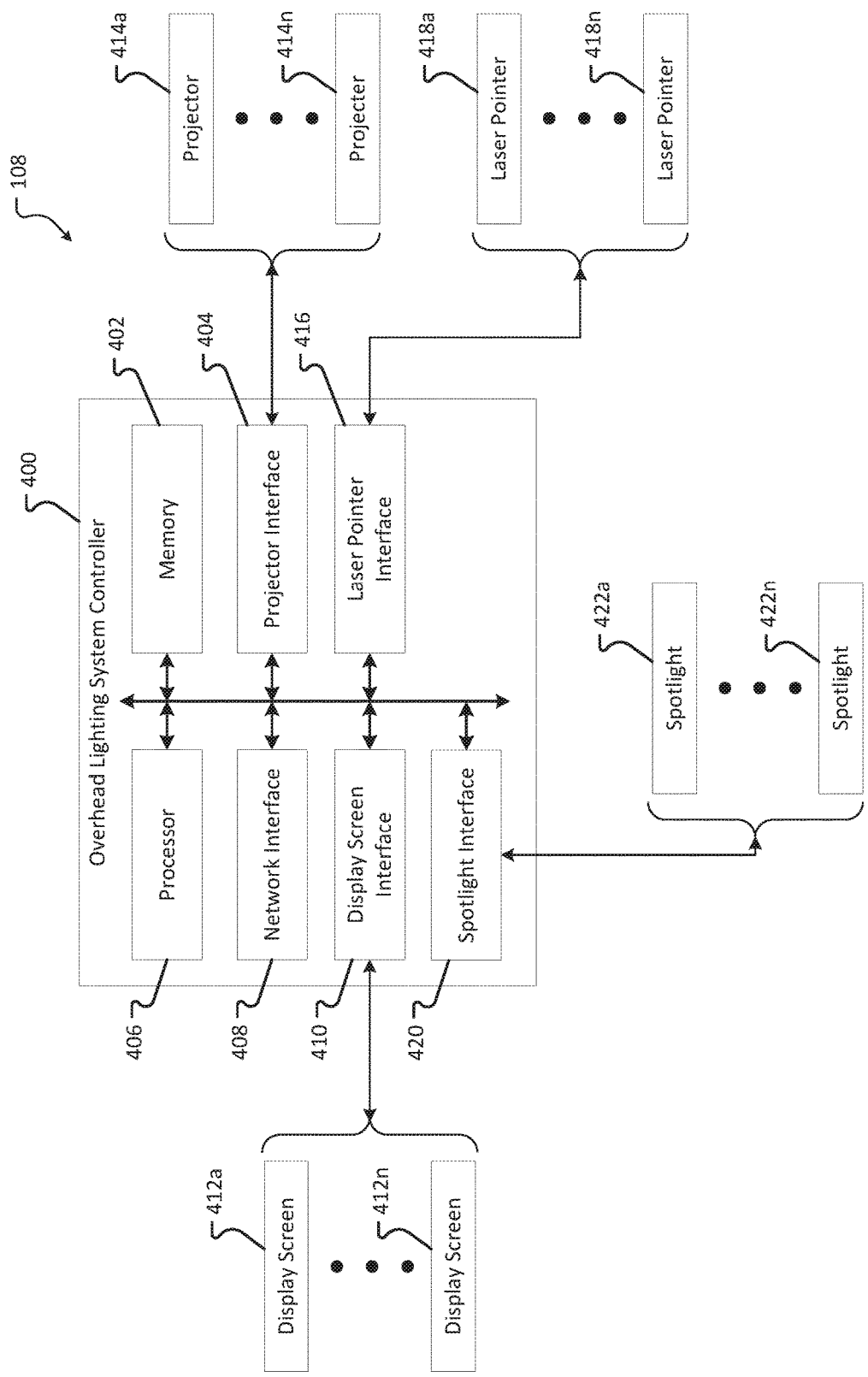
FIG. 4 is a block diagram of a system according to at least one embodiment of the present disclosure.

With respect to FIG. 4, the overhead lighting system 108 may comprise an overhead lighting system controller 400, a plurality of projectors 414a-414n, a plurality of display screens 412a-412n, a plurality of laser pointers 418a-418n, and a plurality of spotlights 422a-422n. The overhead lighting system controller 400 may comprise a memory 402, a processor 406, and a network interface 408. The overhead lighting system controller 400 may further comprise a projector interface 404 and a display screen interface 410. The various components of the overhead lighting system controller operate together control the display of the projectors 414 and the display screens 412 based on information provided by the order server 102, to provide a make line operator with information useful to fulfilling received orders.

The memory 402 and the processor 406 may be substantially the same as or similar to the memory 302 and the processor 306, respectively.

The network interface 408 (which may also be referred to as a communication interface) may comprise hardware that facilitates communications with other devices in the system 100, whether directly or via a local area network 116. For example, communications sent to the overhead lighting system 106 may be received, at least initially, by the network interface 408. Similarly, communications sent from the overhead lighting system 106, and more specifically from the overhead lighting system controller 400, may be sent from or through the network interface 408. The network interface 408 may include an Ethernet port, a Wi-Fi card, a Network Interface Card (NIC), a cellular interface (e.g., antenna, filters, and associated circuitry), or the like. The network interface 408 may be configured to establish and maintain a connection with one or more devices and/or networks of the system 100. The network interface 408 may, for example, be configured to encode and decode communications (e.g., packets) according to a protocol utilized by a network over which the overhead lighting system controller 400 sends and receives communications (e.g. the local area network 116).

The projector interface 404 may be any interface utilized to allow the processor 406 to communicate with and/or control the operation of the projectors 414. The projector interface 404 may receive signals from the processor 406 and send signals to the projectors 414. The ingredient light interface may comprise hardware that includes one or more ports or receptacles for receiving one or more wires connected to the projectors 414a-414n. The projector interface 408 may include one or more physical or digital switches, and may further include, for example, one or more transformers, amplifiers, filters, analog-to-digital converters, digital-to-analog converters, and/or transistors.

Similarly, the display screen interface 410 may be any interface utilized to allow the processor 406 to communicate with and/or control the operation of the display screens 412a-412n. The display screen interface 410 may receive signals from the processor 406 and send signals to the display screens 412a-412n. The display screen interface 410 may comprise hardware that includes one or more ports or receptacles for receiving one or more wires connected to the display screens 412a-412n. The display screen interface 410 may include one or more physical or digital switches, and may further include, for example, one or more transformers, amplifiers, filters, analog-to-digital converters, digital-to-analog converters, and/or transistors.

Similarly, the laser pointer interface 416 may be any interface utilized to allow the processor 406 to communicate with and/or control the operation of the laser pointers 418a-418n. The laser pointer interface 416 may receive signals from the processor 406 and send signals to the laser pointers 418a-418n. The laser pointer interface 416 may comprise hardware that includes one or more ports or receptacles for receiving one or more wires connected to the laser pointers 418a-418n. The laser pointer interface 416 may include one or more physical or digital switches, and may further include, for example, one or more transformers, amplifiers, filters, analog-to-digital converters, digital-to-analog converters, and/or transistors.

Similarly, the spotlight interface 420 may be any interface utilized to allow the processor 406 to communicate with and/or control the operation of the display screens 412a-412n. The spotlight interface 420 may receive signals from the processor 406 and send signals to the display screens 412a-412n. The spotlight interface 420 may comprise hardware that includes one or more ports or receptacles for receiving one or more wires connected to the display screens 412a-412n. The spotlight interface 420 may include one or more physical or digital switches, and may further include, for example, one or more transformers, amplifiers, filters, analog-to-digital converters, digital-to-analog converters, and/or transistors.

The display screens 412 may be any variety of electronic screen or display on which information may be displayed.

The display screens 412 may be, for example, televisions (whether LCD, LED, OLED, plasma, or any other variety), monitors (whether CRT, LCD, OLED, or any other variety), or tablets (including, without limitation, any variety of tablet identified herein). The display screens 412 may be used, for example, to display information received from the order server 102 about new, pending, and/or unfulfilled orders. The display screens may also be used to provide supplemental information (e.g. beyond the information provided by the ingredient lights 312 and the target lights 314) to a make line operator, such as instructions for attaching or otherwise installing or applying a particular component to a product being assembled, or instructions for a particular way to add a certain ingredient to a product being made. In at least one embodiment, the display screens 412 may be used to provide information about an order that cannot be effectively communicated to the make line operator via the ingredient lights 312 and the target lights 314. Also in at least one embodiment, the overhead lighting system controller 400 or the line-level lighting system controller 300 may cause a light to flash, or an audible signal to be played, or some other notification to be given to alert the operator that additional instructions or information are available on the display screens 412. Depending on the size of a given make line, as well as the manner in which the display screens 412 are used on a given make line, the overhead lighting system 108 may contain only one display screen 412.

In at least one embodiment, the display screens 412 may be used primarily as a backup system, in case one or more other indicating or guiding mechanisms utilized by or in the line-level lighting system 106 and/or the overhead lighting system 108 stop working, or in case an operator becomes confused about the guidance provided by the such other indicating or guiding mechanisms. For example, if a make line operator is being guided by ingredient lights 312 and target lights 314 in assembling a variety of products to fill a plurality of orders, but needs to double-check the ingredients for a particular ordered product (e.g. to verify that it has been or is being assembled correctly), then the operator can refer to a display screen 412. A system 100 according to some embodiments of the present disclosure may not include any display screens 412.

The projectors 414a-414n may be used in addition to or instead other indicating mechanisms included in the line-level lighting system 106 and/or the overhead lighting system 108. As persons ordinarily skilled in the art will recognize based on the present disclosure, a projector 414 positioned above a make line may be configurable to project a light or other indication over, adjacent to, or otherwise corresponding to each ingredient and each station. Thus, a projector 414 may be used instead of ingredient lights 312 and target lights 314 to guide a make line operator to use a certain ingredient or component and/or to apply the certain ingredient or component to one or more products being assembled in specific stations. Referring again to the example of an establishment that sells hamburgers, if a make line operator needed to prepare seven hamburgers (three with ketchup and four without) to fill several orders, an overhead projector 414 could project onto a hamburger assembly surface of the establishment seven overhead images of a hamburger bun heel. The make line operator could then place a hamburger bun heel over or next to each of the projected images. The projector 414 could then project, in the same seven locations as the first seven projected images, seven overhead images of a hamburger patter on a hamburger bun heel, indicating to the make line operator that he or she should add a hamburger patty to each of the hamburgers being assembled. Then, the overhead projector 414 might change three of the projected images to show ketchup on the hamburger patty, indicating to the make line operator that he or she should add ketchup to those particular hamburgers. In this manner, the overhead projector 414 can be used to guide the make line operator to make customized hamburgers to fill customer orders.

One or more overhead projectors 414 may also be used to supplement information provided by other mechanisms utilized within the line-level lighting system 106 and/or the overhead lighting system 108. For example, if ingredient lights 312 or target lights 314 are used to provide guidance regarding which ingredients or components to apply to which targets or products, but not to provide guidance regarding the quantity of an ingredient or component to apply to the targets or products, then the projectors 414 may be used to provide quantity information where needed. The projectors 414 could provide such information via a textual indication or a graphical (e.g. non-textual) indication (which may comprise, for example, a particular color, a particular color intensity, or an image), either of which may be projected on or adjacent to the target or product, on or adjacent to the ingredient or component, or onto another surface on or near the make line.

The overhead projectors 414 may also be used to project order information onto or near the make line. For example, instead of using display screens 412 to provide order information, embodiments of the present disclosure may use the projectors 414 to project the order information directly onto a surface of the make line, which may beneficially allow make line operators to reference the information without having to look up from the make line to a display screen. The projected information may comprise a backup system to be referenced by a make line operator only when other indicating mechanisms of the line-level lighting system 106 and the overhead lighting system 108 are inoperative or provide confusing or inconclusive guidance, or the projected information may comprise a primary system intended to be referenced by the make line operator throughout the assembly process.

In addition to the potential uses of the projectors 414 described above, one or more projectors 414 may be used to project graphic partitions onto a preparation or assembly surface of the make line, thus identifying separate stations for the make line operator. The use of projectors 414 to project such partitions onto a make line surface beneficially allows the surface to be free of any physical partitions (e.g. ridges, etchings, walls, fences, etc.) that may interfere with the preparation and/or assembly process, reduce the longevity of the surface, increase the difficulty of cleaning the surface, affect operator safety, and/or violate applicable regulations (e.g. food safety regulations). As one example, a projector may project a grid onto a grill used to cook hamburger patties to guide the placement of the hamburger patties onto the grill. This may be desirable, for example, if a heat sensor positioned above the grill is configured to sense the temperature of the grill at certain locations (e.g. locations defined by the projected grid), or if a laser pointer or spotlight positioned above the grill is configured to shine on or point to certain locations of the grill (e.g. locations defined by the projected grid). In some embodiments, the projected grid may blink, flash, or otherwise change when a predetermined amount of time has passed (e.g. when hamburger patties on the grill need to be flipped, or when they are done cooking and ready to be removed). In other embodiments, a portion of the grid may blink, flash, or otherwise change to indicate a needed action with respect to items within that particular portion of the grid. For example, one or more squares of the grid may alternately flash a solid fill and no fill. In still other embodiments, a spotlight or a laser pointer directed at one or more squares of the grid may blink, flash, or otherwise change to indicate a need action with respect to the item within that particular square of the grid.

The laser pointers 418a-418n may be any known laser pointers suitable for safe use in an enclosed environment. The laser pointers 418 may be mounted above a make line surface. Each laser pointer 418 may be configured to point to a single fixed location on the make line surface, or the laser pointer 418 may be configured to point to multiple locations on the make line surface, whether sequentially or in an apparently simultaneous manner (e.g. by cycling through each location quickly enough to create an illusion that the laser pointer 418 is always pointing at each of multiple locations).

In embodiments, the laser pointers 418 may be used instead of or in addition to line-level lighting system indication mechanisms (e.g. ingredient lights 312, target lights 314) and/or in addition to other overhead lighting system indication or information mechanisms (e.g. display screens 412, projectors 414, spotlights 422). In at least one embodiment, laser pointers 418 may be used instead of other such mechanisms when it would be infeasible or impractical to utilize such mechanisms for a needed purpose. For example, a make line operator may need to receive an indication regarding onto which of a plurality of hamburger patties on a grill he or she should place cheese. It may be infeasible or impractical to install target lights 314 on a grill surface that is kept at a temperature at or above, for example, 300° F., but one or more laser pointers 418 may be utilized to provide the needed indication. In at least one embodiment, the laser pointers 418a-418n may utilize lasers having multiple colors, such that a first indication can be provided by a laser pointer 418 pointing to an ingredient or component, or to a target or product, on a make line, and a second indication can be provided by the color of the laser emitted by the laser pointer 418. Laser color may be used, for example, to provide an indication regarding quantity, type (e.g. sweet pickles versus dill pickles), or readiness (e.g. ready to be removed from a grill versus still cooking). The laser pointers 418 may be positionable, whether manually or automatically, so as to be able to point to more than one location on the make line surface.

Like the laser pointers 418a-418n, the spotlights 422a-422n may be mounted above a make line surface. Each spotlight 422 may be configured to point to a single fixed location on the make line surface. Alternatively, each spotlight 422 may be manually or automatically positionable, so as to be able to point to more than one location on the make line surface. In embodiments, the spotlights 422 may be used instead of or in addition to line-level lighting system indication mechanisms (e.g. ingredient lights 312, target lights 314) and/or in addition to other overhead lighting system indication or information mechanisms (e.g. display screens 412, projectors 414, laser pointers 418). In at least one embodiment, spotlights 422 may be used instead of other such mechanisms when it would be infeasible or impractical to utilize such mechanisms for a needed purpose. For example, a make line operator may need to receive an indication regarding onto which of a plurality of hamburger patties on a grill he or she should place cheese. It may be infeasible or impractical to install target lights 314 on a grill surface that is kept at a temperature at or above, for example, 300° F., but one or more spotlights 422 may be utilized to provide the needed indication. In at least one embodiment, the spotlights 422 may be capable of emitting multiple colors of light, such that a first indication can be provided by a spotlight 422 pointing to an ingredient or component, or to a target or product, on a make line, and a second indication can be provided by the color of the light emitted by the spotlight 422. Spotlight color may be used, for example, to provide an indication regarding quantity, type (e.g. sweet pickles versus dill pickles), or readiness (e.g. ready to be removed from a grill versus still cooking).

Figure 5:
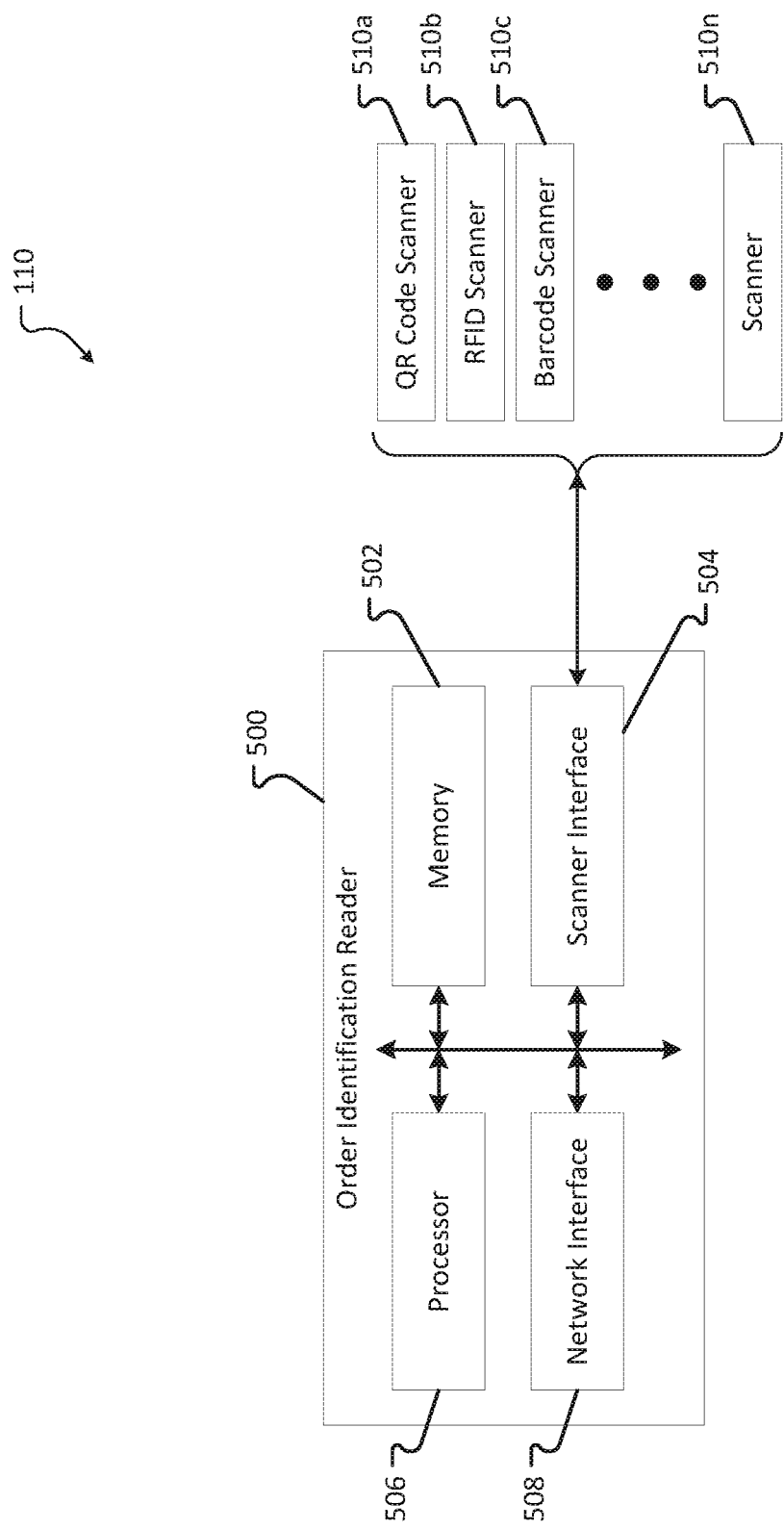
FIG. 5 is a block diagram of a system according to at least one embodiment of the present disclosure.

Turning now to FIG. 5, the order identification reader system 110 may comprise an order identification reader 500 and a plurality of scanners 510a-510n. The order identification reader 500 may comprise a processor 506, a memory 502, a network interface 508, and a scanner interface 504. The scanners 510 may comprise, for example, one or more of a QR code scanner 510a, an RFID scanner 510b, and a barcode scanner 510c.

The memory 502 and the processor 506 may be substantially the same as or similar to the memory 302 and the processor 306, respectively. Additionally, the processor 506 may be configured to correlate a given QR code, RFID code, barcode, or other identification code or number with a given product of a given order, based on information received from the order server 102 and/or information and/or instructions stored in the memory 502. The processor 502 may, for example, be configured to receive information about an ordered product from the order server 502, receive information about a new identification code or number scanned by a scanner 510 positioned at a first station of a make line (e.g. an identification code or number not currently associated with a given product), correlate the ordered product with the new identification code or number, then use that correlation to report on the position of the ordered product as it moves from one make line station to the next. When the ordered product has been completed (which may be determined, for example, based on the ordered product leaving the last station of the make line, or based on the printing of a label for the ordered product (e.g. if the label printer 118 is at the end of the make line)), the processor 506 may be configured to disassociate the new identification code or number from the ordered product, such that it is available to be associated with a new ordered product.

The network interface 508 (which may also be referred to as a communication interface) may comprise hardware that facilitates communications with other devices in the system 100, whether directly or via a local area network 116. For example, communications sent to the order identification reader system 110 may be received, at least initially, by the network interface 508. Similarly, communications sent from the order identification reader system 110, and more specifically from the order identification reader 500, may be sent from or through the network interface 508. The network interface 508 may include an Ethernet port, a Wi-Fi card, a Network Interface Card (NIC), a cellular interface (e.g., antenna, filters, and associated circuitry), or the like. The network interface 508 may be configured to establish and maintain a connection with one or more devices and/or networks of the system 100. The network interface 508 may, for example, be configured to encode and decode communications (e.g., packets) according to a protocol utilized by a network over which the order identification reader 500 sends and receives communications (e.g. the local area network 116).

The scanner interface 504 may be any interface utilized to allow the processor 506 to communicate with and/or control the operation of the scanners 510a-510n. The scanner interface 504 may receive signals from the scanners 510a-510n and send the same or corresponding signals to the processor 506, or vice versa. The scanner interface 504 may comprise hardware that includes one or more ports or receptacles for receiving one or more wires connected to the scanners 510a-510n. The scanner interface 504 may include one or more physical or digital switches, and may further include, for example, one or more transformers, amplifiers, filters, analog-to-digital converters, digital-to-analog converters, and/or transistors.

The scanners 510 may utilize any scanning technology suitable for identifying, for example, the location of a product (or a product container) on a make line, the movement of a product (or a product container) along a make line, or the arrival of a product (or a product container) at a make line station. For example, the scanners 510 may be 1-dimensional barcode readers or 2-dimensional barcode readers (e.g. QR code readers), installed at each station of a make line and configured to scan a barcode affixed to each product (or to each product container (which may be, for example, a plate, a bowl, a box, or a tray) in which products are moved through the make line) as it arrives at a given station. Alternatively, the scanners 510 may be RFID scanners, configured to read an RFID tag affixed to each product or product container as it arrives at a given station. In at least one embodiment using RFID technology, the scanners 510 may not be located at each station, but may be configured to determine a precise position of an RFID tag along a make line (e.g. based on triangulation). In such embodiments, the memory 502 may store information that correlates different locations along a make line with different stations, which information may be accessed by the processor 506 and used to send signals to the order server 102 regarding which indications should be provided at each station. As another alternative, the scanners 510 may comprise image scanners, and the processor 506 may be configured to distinguish among a plurality of scanned images and to associate each scanned image with an ordered product. Additionally or alternatively, the memory 502 may store optical character recognition software, and the processor 506 may execute the optical character recognition software to extract from a scanned image an identification number or code on a product or product container in the image. Other technologies for labeling products or product containers with identification numbers or codes and reading those labels may also be used by the order identification reader system 110 of the present disclosure.

Barcode readers used as scanners 510 may comprise pen-type scanners, laser scanners, CCD readers, camera-based readers, video camera readers, omnidirectional barcode scanners, or cell phone or smart phone cameras. U.S. Pat. No. 5,321,246 describes a bar code scanner with RF coupling to base terminal and automatic turn-off upon decode, which bar code scanner comprises a scanning head for reading bar code symbols, and is hereby incorporated herein in its entirety for all that it teaches and for all purposes.

RFID readers used as scanners 510 may comprise passive readers (used in combination with active tags), or active readers (used in combination with passive tags or active tags). An active tag is an RFID tag that is independently powered, e.g. by a battery or otherwise. As persons ordinarily skilled in the art will recognize, an active tag has an on-board battery and periodically transmits its ID signal. A battery-assisted passive tag has a small battery on board and is activated when in the presence of an (active) RFID reader. A passive tag is cheaper and smaller because it has no battery; instead, the tag uses the radio energy transmitted by the RFID reader. RFID readers used as scanners 510 may be configured to read tags only within the confines of a particular station of a make line, to ensure that the RFID reader identifies only products or product containers that are at the station (e.g. within the station boundaries).

Image scanners used as scanners 510 may comprise, for example, any device that optically scans images, printed text, handwriting, or an object, and converts it into a digital image. Image scanners may be of the flatbed variety, and may be configured to scan product labels or product container labels through a transparent surface of a make line station (e.g. through a glass countertop). Image scanners may also be digital cameras positioned to take a picture of a product label or product container label. The image scanners may use, for example, a charge-coupled device (CCD) or a contact image sensor (CIS) as the image sensor.

In at least one embodiment, the scanners 510 may comprise a processor and a memory that allow the scanner 510 to decode a scanned image, pattern, or tag and report the resulting identification number or code to the processor 506, while in other embodiments, the processor 506 decodes the scanned image, pattern, or tag.

The foregoing description of 1-dimensional barcode readers, 2-dimensional barcode readers, RFID readers, and image scanners is not intended to be limiting. Any type of scanner may be used as a scanner 510 provided that it can be used to determine, within a reasonable degree of certainty, which product or product container is situated at a given make line station.

The order identification reader system 110 may be used in at least one embodiment of the system 100 to ensure that the system 100 identifies the proper ingredients or components for addition to a target or product being assembled or made. The order identification reader system 110 is particularly suitable for make lines configured for making or assembling products in series. For example, in a make line with a plurality of stations, where each station includes several ingredients or components that may be added to a product being assembled or made at that station, and where a make line operator moves the product from one station to the next in order to properly complete the product, an order identification reader system may be configured with a plurality of scanners 510, each located at a separate station. As a product is moved from one station to the next, a scanner 510 recognizes a barcode, QR code, RFID signal, image, text, or other identification feature associated with the product and provides that information to the order server 102. The order server 102 can then cause the line-level lighting system 106 and/or the overhead lighting system 108 to provide the proper indications at the station for that specific product. As different products move through the station, the scanner 510 recognizes the identification feature associated with each product and provides that information to the order server 102; and the order server 102 then causes the line-level lighting system 106 and/or the overhead lighting system 108 to provide the proper indications for the product at the station.

In at least one embodiment of the system 100 utilized with a sequential make line such as that described above, a timer may be used instead of an order identification reader system 110 to cause the order server 102 to instruct the line-level lighting system 106 and/or the overhead lighting system 108 to provide indications for a subsequent product to be assembled. For example, a system 100 utilizing a timer may be configured to provide indications (e.g. lighting cues or other guidance via the line-level lighting system 106 and/or the overhead lighting system 108) for a given product at a given station for 10 seconds at a time. Then, if the make line with which the system 100 is being used has three stations, and three products need to be made, the indications would be provided as shown in the following table:

|  | Station 1 Provides Indications for: | Station 2 Provides Indications for: | Station 3 Provides Indications for: |
|---|---|---|---|
| 1-10 seconds | Product 1 | N/A | N/A |
| 11-20 seconds | Product 2 | Product 1 | N/A |
| 21-30 seconds | Product 3 | Product 2 | Product 1 |
| 31-40 seconds | N/A | Product 3 | Product 2 |
| 41-50 seconds | N/A | N/A | Product 3 |

While the present disclosure encompasses the use of a timer and one or more predetermined times to determine when to switch the indications provided at a given station as disclosed above, such embodiments may be problematic if it takes longer than the predetermined time to apply the ingredients or components at a given station to a product, because then the indications will switch before the products being assembled or made switch stations, which would result in the indications at each station being incorrect, and may confuse the make line operator. Similarly, if it takes less than the predetermined time to apply the ingredients corresponding to a given station to a product, then the use of predetermined times forces the make line operator to wait until the predetermined time expires before he or she receives the indications applicable to the product in question at the next station. And, even if a given product does not require any ingredients from a given station, the make line operator will still be forced to wait for the expiration of the predetermined time before he or she receives the proper indications at the subsequent station. In light of these drawbacks of using a timer and a predetermined time, use of an order identification reader system 110 beneficially allows the system 100 to display the proper indications for a given product at a given station when the product arrives at the station, regardless of how long it remains at the station or at the preceding station.

If, on the other hand, an order identification reader system 110 is utilized in connection with the system 100, then the potential drawbacks of using a timer to determine when to switch the indications provided by the line-level lighting system 106 and/or the overhead lighting system 108 may be avoided. As an alternative to both a timer and an order identification reader system 110 utilizing one or more scanners 510, each station of a make line may be equipped with a button, switch, or other input mechanism that a make line operator can press or trigger each time he or she moves a product or product container into the station. The order server 102 may be configured to detect the pressing or triggering of the button, switch, or other input mechanism, and may further be configured to cause the line-level lighting system 106 and/or the overhead lighting system 108 to provide indications for the next product in a product queue (e.g. the next product to be made) each time the pressing or triggering of the button, switch, or other input mechanism is detected.

This embodiment has some benefits over the use of a timer (including, most importantly, that the indications change on demand, such that a make line operator can take as much time as needed at each station, without having to waste time waiting for the indications to switch to move to the next station. However, this embodiment still has drawbacks as compared to the use of an order identification reader system 110, including that if the make line operator inadvertently presses the button or switch twice, or if the make line operator forgets to press the button or switch, then the line-level lighting system 106 and/or the overhead lighting system 108 will provide the wrong indications for the product or product container at the station. Additionally, the use of a button or switch to cause the switching of the indications provided by the line-level lighting system 106 and/or the overhead lighting system 108 does not allow for any way to confirm that the indications being provided are the correct indications for the product or product container currently at the station. These drawbacks may be overcome at least in part, however, through the use of logical controls (e.g., configuring the order server 102 to not register a button press or switch toggle that occurs within a predetermined period of time (e.g. 2 seconds, 3 seconds, 5 seconds, 10 seconds) after a previous press of the same button or a previous toggle of the same switch, respectively), and/or by configuring the button or switch to be pressed or toggled automatically (such that movement of the product or product container to the station will automatically trigger the input mechanism), and/or by providing one or more display screens 412 that a make line operator can reference to determine which order corresponds to the indications being provided at a given make line station.

Figure 6:
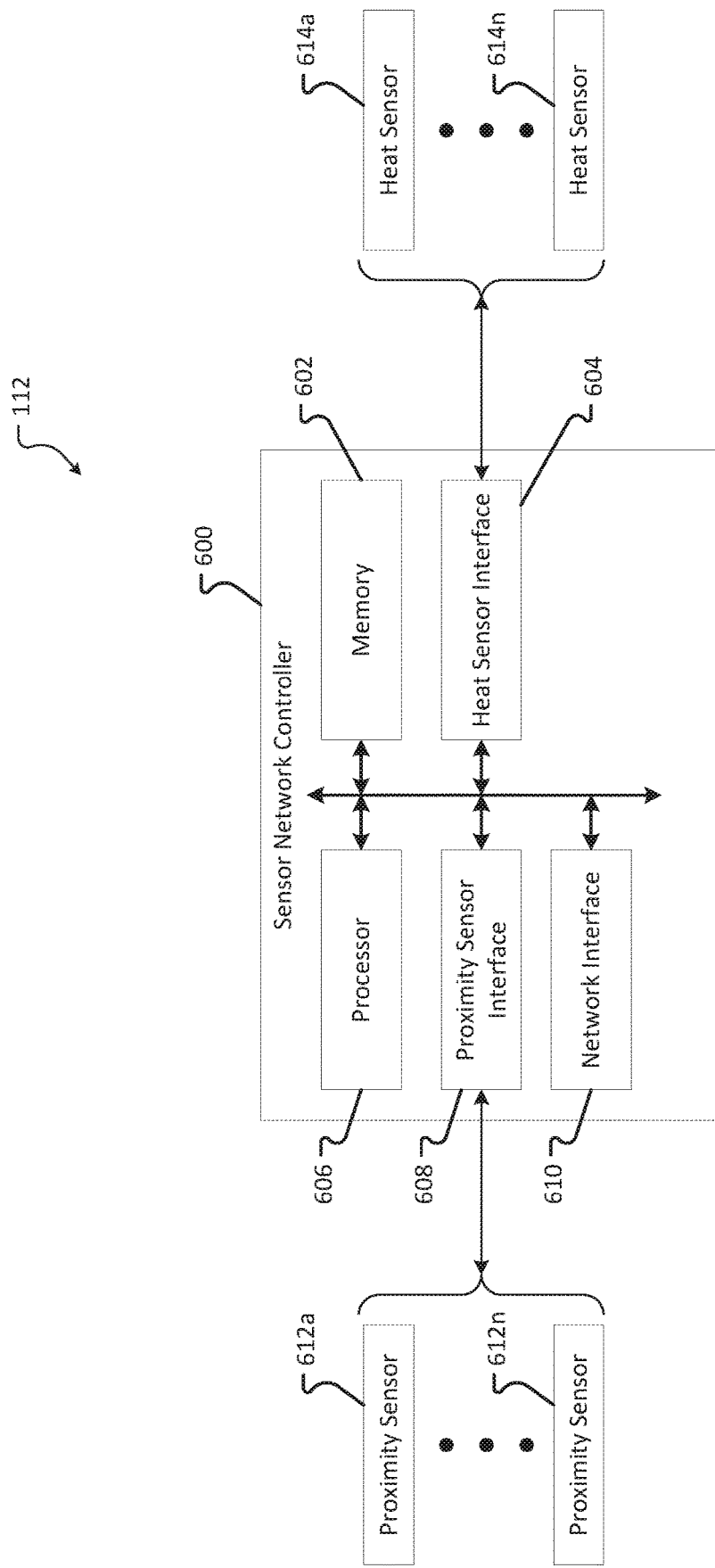
FIG. 6 is a block diagram of a system according to at least one embodiment of the present disclosure.

With reference now to FIG. 6, a sensor network 112 may comprise a sensor network controller 600 in communication with one or more proximity sensors 612 and one or more heat sensors 614. Although not depicted in FIG. 6, the sensor network 112 may comprise any other type or variety of sensor suitable for accomplishing the purposes identified herein.

The sensor network controller 600 may comprise a memory 602, a processor 606, a heat sensor interface 604, a proximity sensor interface 608, and a network interface 610. The memory 602 and the processor 606 may be substantially the same as or similar to the memory 302 and the processor 306, respectively.

The network interface 610 (which may also be referred to as a communication interface) may comprise hardware that facilitates communications with other devices in the system 100, whether directly or via a local area network 116. For example, communications sent from the sensor network controller 600 to the order server 102 may be transmitted via the network controller 610, and communications received from the order server 102 by the sensor network controller may be received via the network interface 610. The network interface 610 may include an Ethernet port, a Wi-Fi card, a Network Interface Card (NIC), a cellular interface (e.g., antenna, filters, and associated circuitry), or the like. The network interface 610 may be configured to establish and maintain a connection with one or more devices and/or networks of the system 100. The network interface 610 may, for example, be configured to encode and decode communications (e.g., packets) according to a protocol utilized by a network (e.g. a network other than a sensor network) over which the sensor network controller 600 sends and receives communications (e.g. the local area network 116).

The heat sensor interface 604 may be any interface utilized to allow the processor 606 to communicate with and/or control the operation of the heat sensors 614a-614n. The heat sensor interface 604 may receive signals from the heat sensors 614a-614n and send the same or corresponding signals to the processor 606, or vice versa. The heat sensor interface 604 may comprise hardware that includes one or more ports or receptacles for receiving one or more wires connected to the heat sensors 614a-614n. The heat sensor interface 604 may include one or more physical or digital switches, and may further include, for example, one or more transformers, amplifiers, filters, analog-to-digital converters, digital-to-analog converters, and/or transistors.

The heat sensors 614a-614n may be any suitable heat sensor that can be configured to provide a signal to the sensor network controller 600 via the heat sensor interface 604. Suitable heat sensors 614 may be or comprise, for example, a thermistor, a thermocouple, a resistance thermometer, a silicon bandgap temperature sensor, and/or a thermal-infrared imager. One or more of the heat sensors 614 may be attached to a mechanical device that can raise and/or lower the heat sensor 614 into a position where it can obtain a useful temperature reading. For example, a plurality of heat sensors 614 on extendable mechanical arms may be positioned over a grill with a plurality of cooking positions for cooking hamburger patties, and the mechanical arms may extend to a predetermined level over the grill surface so as to place the heat sensors 614 in contact with each hamburger patty and enable measurement of the temperature of each hamburger patty on the grill. For heat sensors 614 that are capable of remote temperature measurement (e.g. heat sensors 614 that need not be in physical contact with the object whose temperature is being measured in order to obtain a temperature measurement), the heat sensors 614 may be positioned in any suitable location in the vicinity of the make line that allows the heat sensors 614 to obtain a useful measurement. For example, a thermal-infrared imager may be positioned on the ceiling above a grill, or inside of a vent hood positioned over a grill, where it can be used to measure the temperature of hamburger patties or any other items being cooked on the grill. In at least one embodiment, heat sensors 614 may be used to ensure that ingredients or components on a make line remain within a desired temperature range (if they are not being actively heated or cooled) or reach a desired temperature or temperature range (if they are being actively heated or cooled).

In operation, a sensor network controller 600 may receive temperature measurements (or signals corresponding to temperature measurements) from one or more heat sensors 614 via the heat sensor interface 604. The processor 606 may perform one or more processing operations on the received information (e.g. one or more filtering operations, one or more conversion operations) before sending useable temperature information to the order server 102. Alternatively, the processor 606 may simply cause information received from the heat sensors 614 to be transmitted as-is to the order server 102 for processing by the order server processor 132. In any event, the order server 102 may send instructions to one or both of the line-level lighting system 106 and the overhead lighting system 108 based on the received temperature information. For example, the received temperature information indicates that a hamburger patty at a particular cooking station on a grill has reached a predetermined minimum temperature, then the order server 102 may cause the overhead lighting system 108 to shine a laser on the hamburger patty, or may cause the line-level lighting system 106 to illuminate a light that corresponds to the particular cooking station, thus indicating to the make line operator that the hamburger patty is ready to be turned or removed from the grill. As another example, the order server 102 may instruct one or both of the line-level lighting system 106 and the overhead lighting system 108 to provide an indication that a particular ingredient on a make line has exceeded a predetermined, acceptable temperature range. The indication may be, for example, a red light corresponding to the particular ingredient. In at least one embodiment, the order server 102 may cause an alarm to sound if an ingredient exceeds or falls below an acceptable temperature range.

The proximity sensor interface 608 may be any interface utilized to allow the processor 606 to communicate with and/or control the operation of the proximity sensors 612a-612n. The proximity sensor interface 608 may receive signals from the proximity sensors 612a-612n and send the same or corresponding signals to the processor 606, or vice versa. The proximity sensor interface 608 may comprise hardware that includes one or more ports or receptacles for receiving one or more wires connected to the proximity sensors 612a-612n. The proximity sensor interface 608 may include one or more physical or digital switches, and may further include, for example, one or more transformers, amplifiers, filters, analog-to-digital converters, digital-to-analog converters, and/or transistors.

The proximity sensors 612a-612n may be or comprise a capacitive sensor, capacitive displacement sensor, eddy-current sensor, inductive proximity sensor, magnetic sensor, photodetector, Hall effect sensor, or any other sensor suitable for detecting proximity and/or position. The proximity sensors 612 may be configured, for example, to determine when an ingredient or component has been removed from its normal storage location. The proximity sensors 612 may be used to provide information to the order server 102 about which ingredient container or component container has just been accessed or replaced, which information may be used by the order server 102 to determine when to cause the line-level lighting system 106 and/or the overhead lighting system 108 to provide indications for a different ingredient. For example, a proximity sensor 612 may be configured to detect when a ketchup bottle has been removed from a ketchup bottle holder on a hamburger make line. When the proximity sensor 612 detects that the ketchup bottle has been removed, it may send a signal (or stop sending a signal) to the sensor network controller 600 via the proximity sensor interface 608. The processor 606 may then determine that the signal came from the proximity sensor 612 associated with the ketchup, and may send a signal to the order server 102 via the network interface 610 indicating that the ketchup bottle has been removed. (Alternatively, the processor 606 may cause the signal received from the proximity sensor 612 to be provided as-is to the processor 132 of the order server 102.) Upon receipt of the signal from the sensor network controller 600, the order server 102 may cause the line-level lighting system 106 and/or the overhead lighting system 108 to provide indications identifying the products on the make line to which ketchup should be applied. Or, in other embodiments, order server 102 may receive an indication from the sensor network controller 600 indicating that the ketchup bottle has been replaced, in response to which the order server 102 may cause the line-level lighting system 106 and/or the overhead lighting system 108 to provide indications for the next ingredient or component to be applied (e.g. mustard).

In at least one embodiment, in addition to or instead of a proximity sensor, a sensor network 112 may comprise a scale or a pressure sensor that can detect changes in weight (e.g. changes in the weight of an ingredient or component container), and/or a motion sensor or other sensor that can detect movement of, for example, a make line operator's hand as it reaches into an ingredient or component container. Such sensors may be particularly well-suited for use with ingredients or components that, unlike a ketchup bottle, do not come in a container that will be replaced once the ingredient or component is dispensed (e.g. for a hamburger make line, cheese, tomatoes, lettuce, onions, and pickles).

Also in some embodiments, a sensor network 112 may comprise one or more optical sensors. The optical sensors (or other sensors) may be used to determine, for example, where one or more ingredients or components, and/or where one or more products being assembled, are located. For example, an optical sensor or a weight sensor could be used to determine where a particular hamburger patty is located. Such information may then be used by the order server 102 to ensure that the proper ingredients are added to the corresponding products. For example, when a make line operator places a hamburger patty on a grill, the order server 102 may identify, based on information from an optical or weight sensor, the location of the hamburger patty on the grill. The order server 201 may automatically assign that hamburger patty to a specific ordered product, and may start a timer to ensure that the hamburger patty is cooked for the proper amount of time based on the order. When the timer expires, the order server 102 may cause the line level lighting system 106 and/or the overhead lighting system 108 to provide an indication to the make line operator to flip or remove that specific hamburger patty.

Figure 7:
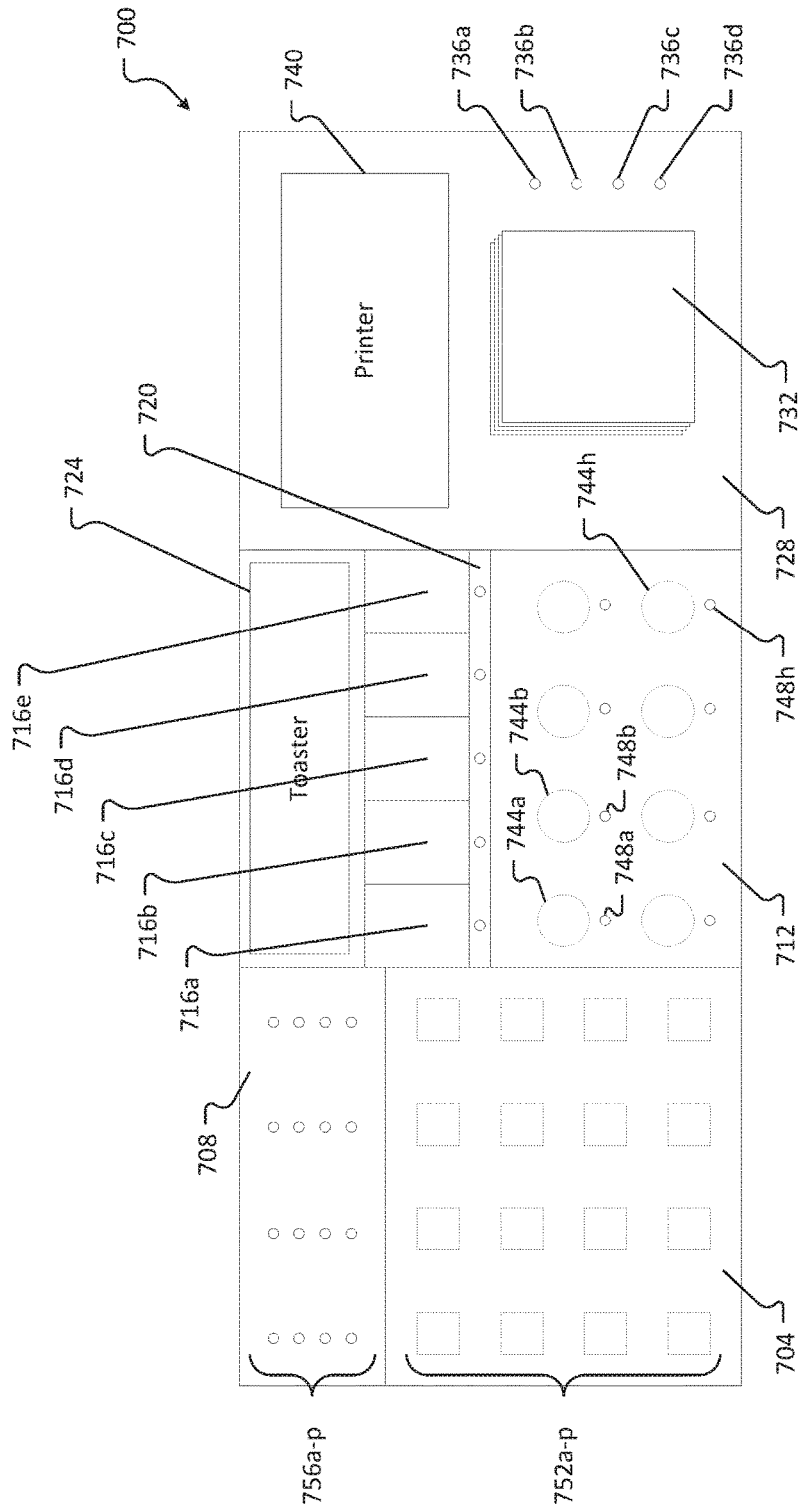
FIG. 7 is a top view of a make line according to at least one embodiment of the present disclosure.

With reference now to FIG. 7, a hamburger make line 700 configured to utilize systems and methods of the present disclosure may include a grill 704 comprising a plurality of cooking stations 752a-752p; an indicator panel 708 comprising a plurality of lights 756a-756p, each of which corresponds to one of the cooking stations 752a-752p; a product preparation surface 712 comprising a plurality of product preparation stations 744a-744h, and a plurality of corresponding indicator lights 748a-748h; a plurality of ingredient containers 716a-716e, each corresponding to an indicator light positioned on an indicator light strip 720; a toaster 724; and a finishing station 728 comprising a wrapping station 732, a series of indicating lights 736a-736d, and a label printer 740.

The grill 704 may be any cooking or heating surface, and is used to cook hamburger patties. The cooking stations 752a-752p may be etched into the grill surface, or projected onto the grill surface by a projector 414. In at least one embodiment, the cooking stations 752a-752p may not be actually delineated on the grill surface, but rather may be familiar to an operator of the make line 700.

The indicator panel 708 may comprise a separate indicator light 756 for each cooking station 752, and may be arranged so that the location of each indicator light 756 corresponds to the location of each cooking station 752. For example, the lower left cooking station 752 on the grill 704 may correspond to the lower left indicator light 756 on the indicator panel 708. In other embodiments, the indicator panel 708 may be positioned in a different location relative to the grill 704. Also in other embodiments, the indicator lights 756 may be replaced by one or more spotlights 422 or laser pointers 418 positioned to highlight individual cooking stations 752. In still other embodiments, a grill 704 may not comprise or be associated with any indicator lights 756. For example, if every hamburger will include a hamburger patty, and every hamburger patty is the same, then the indicator lights 756 may be unnecessary.

The indicator lights 756 may be used for a variety of purposes. For example, the indicator lights 756 may be used to indicate that a hamburger patty at a given cooking station 704 has reached a predetermined temperature (based, for example, on information provided by a heat sensor 614 and communicated from a sensor network controller 600 to an order server 102). The indicator lights may be used to indicate to a make line operator which hamburger patty should be next turned or removed from the grill, or onto which cooking station 752 a new hamburger patty should be placed for cooking. The indicator lights 756 may be used to indicate onto which hamburger patties a slice of cheese (or any other ingredient or component) should be placed (e.g. to make an ordered cheeseburger). The indicator lights 756 may be used to indicate whether the hamburger patty at the corresponding cooking station 752 should be cooked to a rare, medium, or well-done state, or whether a small, medium, or large hamburger patty should be placed at a given cooking station. The indicator lights 756 may each comprise multiple colors of lights, and different colors of lights may mean different things (e.g. a red light may mean that a hamburger patty should be placed on the corresponding cooking station 752, a yellow light may mean that the hamburger patty at the corresponding cooking station 752 is still cooking, and a green light may mean that the hamburger patty at the corresponding cooking station 752 has been cooked. Additionally or alternatively, the indicator lights 756 may be capable of being illuminated at different intensity levels, and each intensity level may mean something different. For example, a low intensity level may indicate that a hamburger patty at the corresponding cooking station should be cooked until it is rare, a medium intensity level may indicate that a hamburger patty should be cooked until it is medium, and a high intensity level may indicate that a hamburger patty should be cooked until it is well-done.

The product preparation surface 712 may be any surface suitable for use in preparing food. In at least one embodiment, the product preparation surface 712 may be transparent or semi-transparent, and one or both of the markings delimiting the product preparation stations 744a-744h, and the indicator lights 748a-748h, may be located beneath the upper surface of the product preparation surface 712. In other embodiments, the indicator lights 748a-748h may be positioned above, at, or immediately below the upper surface of the product preparation surface. Additionally, the markings delimiting the product preparation stations 744a-744h may be etched or carved into the product preparation surface 712, or painted onto the product preparation surface 712, or affixed onto the product preparation surface 712, or projected onto the product preparation surface 712 by a projector 414. As persons of ordinary skill in the art will recognize based on the present disclosure, some of the foregoing options may be better-suited for make lines configured for the preparation and assembly of food, while others of the foregoing options may be better-suited for non-food product assembly lines.

The ingredient containers 716a-716e may each contain a separate ingredient. For example, the ingredient container 716a may contain a ketchup bottle; the ingredient container 716b may contain lettuce; the ingredient container 716c may contain onions; the ingredient container 716d may contain pickles; and the ingredient container 716e may contain tomatoes. Each ingredient container 716 is positioned adjacent an indicator light on the indicator light strip 720. The toaster 724 is used for toasting hamburger buns. The wrapping station 732 comprises a plurality of wrapping paper sheets for wrapping finished hamburgers, and the label printer 740 prints labels that can be affixed to each wrapped hamburger. The indicator lights 736a-736d may provide an indication of which label will be printed next (or has been printed and is awaiting removal from the label printer 740), and may generically correspond to a row of product preparation stations 744. For example, if the indicator light 736a illuminates, then it may correspond to the product preparation station 744a (i.e. the first product preparation station on the top row of product preparation stations) or, if the product preparation station 744*a* is empty, then it may correspond to the product preparation station 744*e* (i.e. the first product preparation station on the next row of product preparation stations). Likewise, if the indicator light 736*b* illuminates, then it may correspond to the product preparation station 744*b* (i.e. the second product preparation station on the top row of product preparation stations) or, if the product preparation station 744*b* is empty, then it may correspond to the production preparation station 744*f* (i.e. the second product preparation station on the next row of production preparation stations).

The make line 700 may be operated as follows. As each new hamburger order is received, an order server 102 may cause another indicator light 756 to illuminate, thus indicating to the make line operator that he or she should add another hamburger patty to the cooking station 752 of the grill 704 corresponding to the illuminated light 756. Once a hamburger patty is added, the make line operator may push a button to start a cooking timer, or a heat sensor 614 may detect that a hamburger patty has been added to the grill based on a sudden change in temperature at a given cooking station 752. The indicator light 756 corresponding to the cooking station 752 may change colors, change intensity level, or flash once a predetermined cooking time has passed, or once the heat sensor 614 has detected that the hamburger patty has reached a desired temperature. In at least one embodiment, the make line operator may receive some indication of the desired temperature of a given hamburger patty, while in other embodiments, the order server 102 may interact with the various other components of the system 100 to ensure that the hamburger patty is cooked to the temperature specified in the order (or the temperature corresponding to a specified level) without any indication to the make line operator other than that the hamburger patty is ready to be turned or is done cooking.

When the make line 700 is running at or near capacity, a plurality of hamburger patties may be done cooking at approximately the same time. When the make line 700 is running below capacity, hamburger patties may finish cooking in small increments. For purposes of illustration, the first scenario will be used in describing the operation of the make line 700.

In some embodiments, an order server 102 may identify, based on information obtained with an optical, weight, heat, or other sensor, that a particular hamburger patty has been removed from the grill 704. The order server 102 may then use that information to cause the appropriate indicator lights 760 to illuminate so that the make line operator knows which ingredients to assemble together with the completed hamburger patty to create an ordered product. In other embodiments, the make line 700 may comprise an operator input via which the make line operator can indicate which hamburger patty or patties have been removed from the grill (e.g. by the location of the hamburger patty or patties on the grill prior to removal), so that the order server 102 can cause the appropriate indicator lights 760 to illuminate to guide the make line operator to assemble the corresponding ordered products. For example, if each indicator light 756*a*-756*p* is also a button, then when a make line operator removes a hamburger patty from the location 752*e*, the make line operator may press the indicator light/button 756*e*, which may cause a signal to be sent to the order server 102 indicating that the make line operator is about to assemble the ordered hamburger corresponding to the hamburger patty that was being cooked at the location 752*e*. The order server 102 may then cause the indicator lights 760 to illuminate as necessary to inform the make line operator which ingredients should be included with the hamburger patty that was removed from the location 752*e* to complete a particular ordered product.

Figure 8:
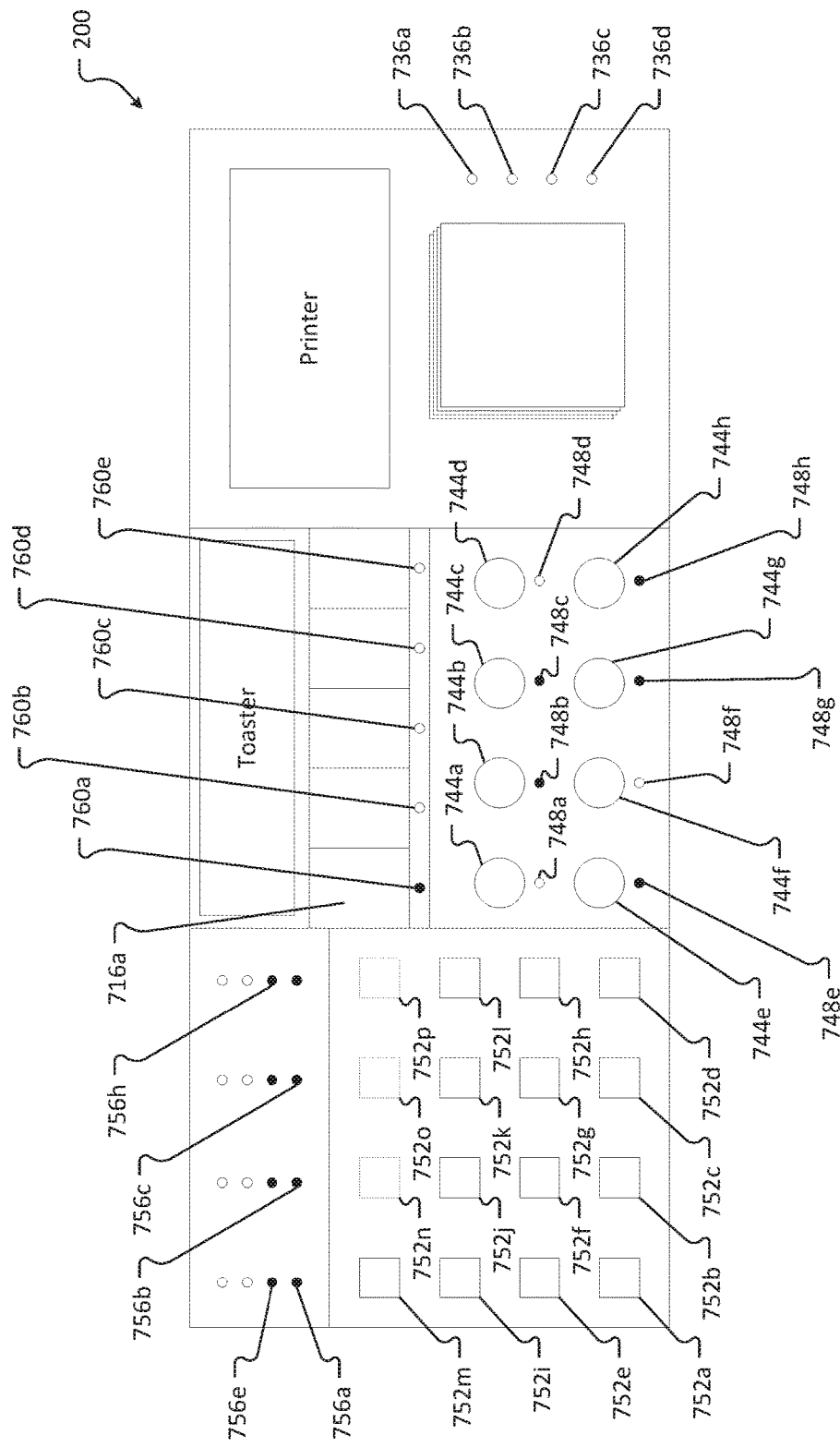
FIG. 8 is another top view of a make line according to at least one embodiment of the present disclosure.

Referring now to FIG. 8, a plurality of hamburger patties are positioned on the grill 704, at cooking stations 752*a*-752*m*. Cooking stations 752*n*-752*p* are empty. Indicator lights 756*a*-756*h* are illuminated, indicating that the hamburger patties at the cooking stations 752*a*-752*h* are fully cooked. While the hamburger patties are cooking, the make line operator may have toasted eight hamburger buns (corresponding to the eight product preparation stations 744*a*-744*h*) in the toaster 724, then, as shown, placed one hamburger bun heel on each product preparation station 744. The order server 102 may have stored in memory 122, among its standard procedures 124, which ingredients are in which ingredient containers 716. The order server 102 has caused the indicator light 760*a* corresponding to the ingredient container 716*a* (which holds a ketchup bottle) to illuminate, and has also caused the indicator lights 748 corresponding to each hamburger that is to receive ketchup to illuminate. Thus, the illuminated indicator lights 756*a*-756*h* indicate that the make line operator should remove the hamburger patties at the cooking stations 752*a*-752*h* from the grill 704 and place them on the hamburgers being prepared at the product preparation stations 744. The illuminated indicator light 760*a*, together with the illuminated indicator lights 748*b*, 748*c*, 748*e*, 748*g*, and 748*h*, indicate that ketchup should be applied to the hamburgers being prepared at the cooking stations 744*a*, 744*c*, 744*e*, 744*g*, and 744*h*.

When the make line operator removes and then replaces the ketchup bottle in the ingredient container 716*a*, a proximity sensor 612 (coupled with the sensor network controller 600) will detect that the ketchup bottle has been returned, and will send a corresponding signal to the order server 102. The order server 102 will then cause the line-level lighting system 106 and/or the overhead lighting system 108 to provide indications for the next ingredient.

Figure 9:
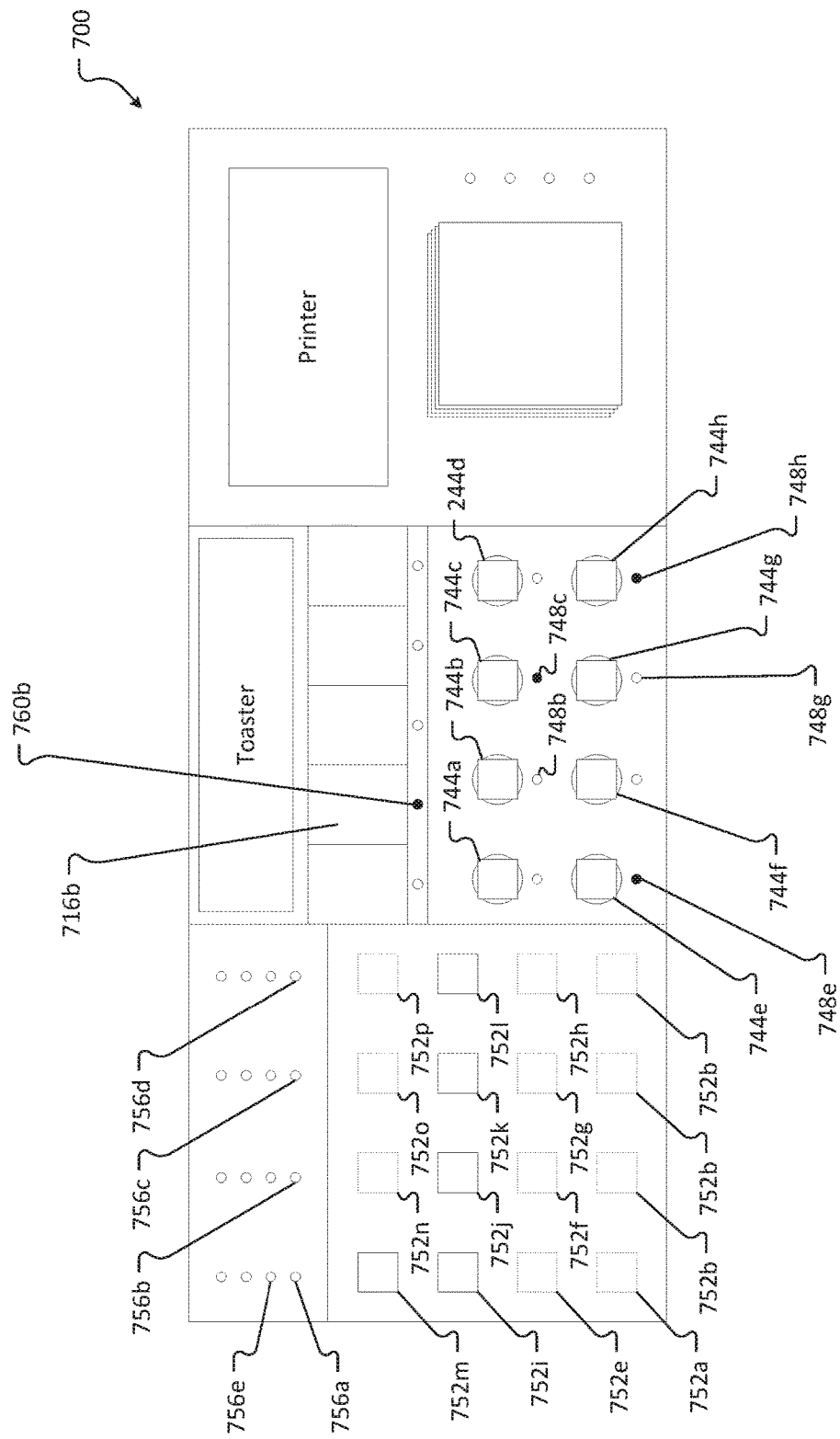
FIG. 9 is yet another top view of a make line according to at least one embodiment of the present disclosure.

Turning now to FIG. 9, the cooking stations 752*a*-752*h* are now empty, the hamburger patties that were previously being cooked thereon having been placed on the hamburgers being prepared at the cooking stations 744*a*-744*h*. The indicator lights 756*a*-756*h* are no longer illuminated, and neither is the light 760*a* corresponding to the ingredient container 716*a* holding a ketchup bottle. Now, the indicator light 760*b* is illuminated, indicating that lettuce should be applied next, and the indicator lights 748*c*, 748*e*, and 748*h* are illuminated, identifying the hamburgers that are to receive lettuce.

Because lettuce is lightweight and does not come in a bottle, the ingredient container 716*b* may be associated with a motion sensor that detects when the make line operator has reached into the lettuce container 716*b*. The sensor controller 600 or the order server 102 may start a timer when motion at the lettuce container 716*b* is detected, which may be used to determine when a predetermined amount of time (e.g. 2 seconds, or 3 seconds, or 5 seconds, or any other suitable amount of time) has passed since the last time motion was detected. If the make line operator has to reach into the ingredient container several times to get the needed amount of lettuce, the timer will start over each time. Once the timer expires, then the sensor controller 600 may notify the order server 102 (if the sensor controller 600 operated the timer). Once the order server 102 receives a notification that the time has expired (whether from the sensor controller 600, or from the timer itself, if the order server 102 operated the timer), the order server 102 may cause the line-level lighting system 106 and/or the overhead lighting system 108 to provide indications for the ingredient in the ingredient container 760c (e.g. onion). The same or a similar process is followed until every ingredient has been applied.

In at least embodiment, an advance button or override button may be provided that a make line operator can press to manually cause the order server 102 to provide indications for the next ingredient. Such a button may be used instead of or in addition to the various sensors and timers described herein. Also in at least one embodiment, a back button may be provided, that a make line operator can press to manually cause the order server 102 to provide indications for the previous ingredient. Such a button may be useful if the order server 102 prematurely advances from providing indications for one ingredient to providing indications for the next ingredient.

Once the last ingredient has been applied to the appropriate hamburgers, and the order server 102 has received a notification corresponding to the same (e.g. once a given amount of time has expired since motion was detected by a sensor 612 of the sensor network 112, or since a change in the weight of the ingredient container 716e has been detected, then the make line operator may place hamburger bun crowns on each of the hamburgers at the product preparation stations 744, and the order server 102 may cause the label printer 740 to print a label for the hamburger at the product preparation station 744a.

Figure 10:
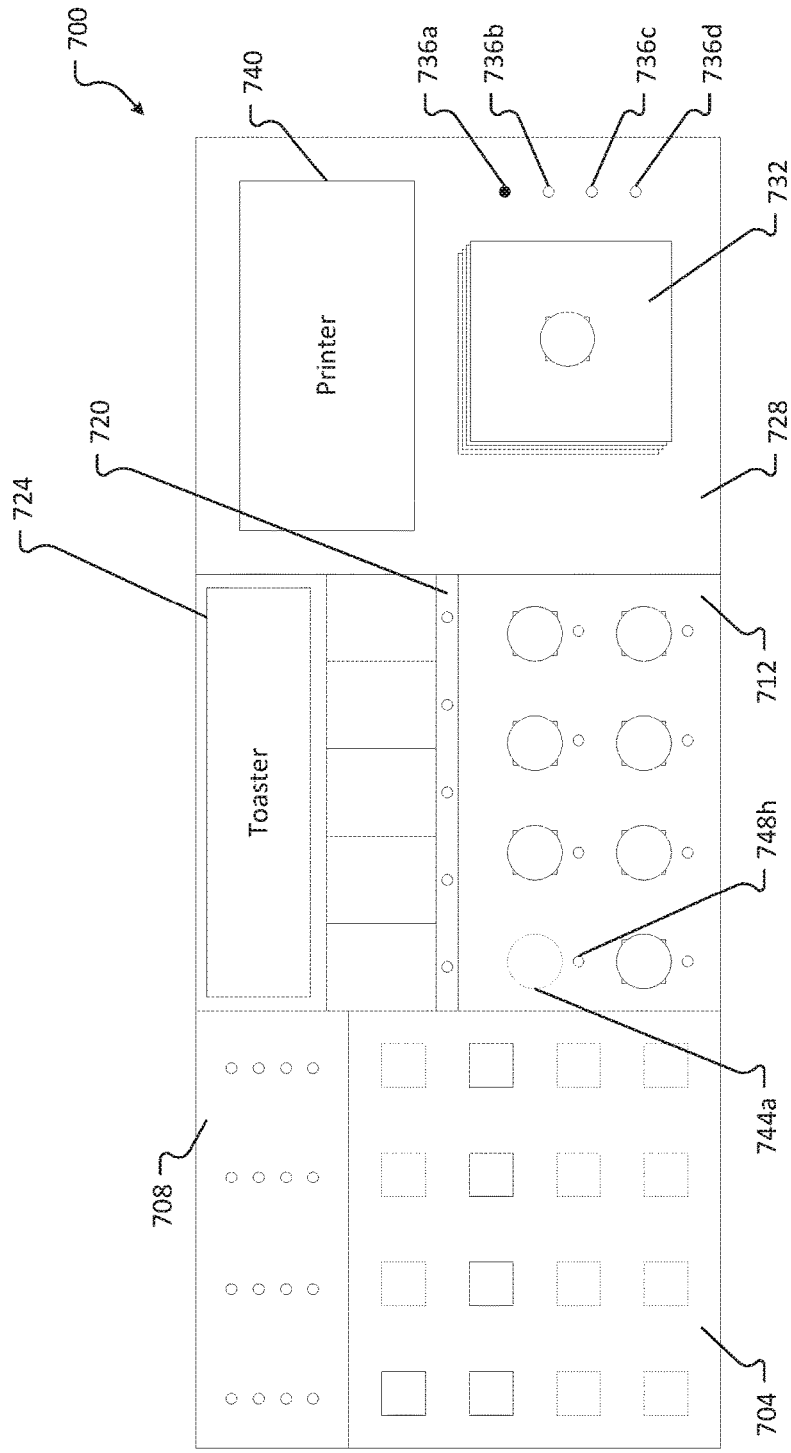
FIG. 10 is still another top view of a make line according to at least one embodiment of the present disclosure.

Referring now to FIG. 10, each hamburger at a product preparation station 744 has been completed. Indicator light 736a is illuminated, indicating that the printer has printed a label corresponding to the first hamburger in the first row of the product preparation stations 744—in other words, for the hamburger at the product preparation station 744a. The make line operator has thus removed the hamburger from the product preparation station 744a and placed it on a wrapping paper sheet at wrapping station 732. Once the make line operator has wrapped the hamburger, he or she can remove the label from the label printer 740, which will then print a label for the hamburger at the product preparation station 744b, and will illuminate the indicator light 736b. When the label printer 740 detects that the label for a particular order has been removed, the label printer 740 may send a signal to the order server 102 indicating that the order has been completed. The order server 102 may then send a signal to the cashier terminal 104 indicating that the order has been completed (e.g. so that a cashier can advise the customer who placed the order that the order is ready to be retrieved, and/or so that a waiter or waitress can retrieve the order and deliver it to a waiting customer), and/or the order server 102 may then send a signal or message via the wide area network indicating that the order has been completed. For example, the order server 102 may send an email or a text message to an email address or a phone number associated with the order indicating that the order has been completed and is ready for pickup, and/or that the order has been completed and will soon be delivered.

Depending on the amount of time it takes to make the hamburgers at the product preparation stations 744 and then wrap and label those hamburgers, the indicator lights 756 corresponding to the hamburger patties still on the grill 704 may illuminate. In that case, the make line operator may remove the hamburger patties from the grill and place them in a storage location for later use, or the make line operator may replace completed hamburgers at the product preparation stations 744 with hamburger bun heels (onto which cooked hamburger patties may be placed) as he or she removes the completed hamburgers from the product preparation stations 744 for wrapping.

Figure 11:
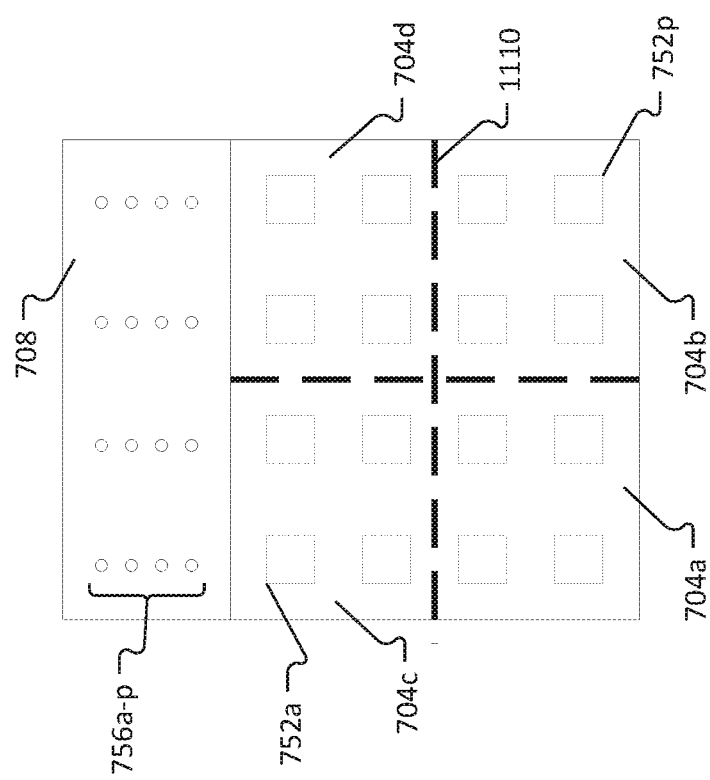
FIG. 11 is a top view of a portion of a make line according to at least one embodiment of the present disclosure.

Referring now to FIG. 11, a grill 704 may be divided into a plurality of sections 704a-704d with a partition 1110. The partition 1110 may be etched, milled, or formed into the grill surface, or marked on the grill surface with a heat-resistant material, or projected onto the grill surface with an overhead projector 414. Different sections of the grill may be maintained at different temperatures for cooking different products or for cooking the same product to different degrees. Additionally or alternatively, different sections of the grill may be associated with different cooking times. For example, products or product components being cooked on the grill section 704a may be cooked for 60 seconds, and products or product components being cooked on the grill section 704b may be cooked for 90 seconds. In other embodiments, different grill sections may be used for cooking different products, e.g. to avoid cooking a product to which some customers may be allergic in the same section as other products.

The indicator lights 756a-756p may, in at least one embodiment, illuminate to inform the operator not to perform an action with respect to the corresponding product. For example, on a hamburger make line, an indicator light 756 may illuminate to indicate that the make line operator should not put cheese on the hamburger patty at the corresponding cooking station 752. Use of indicator lights 756 to indicate that a given action should not be performed may be most useful when the action in question is to be performed by default. Thus, for example, if the default is to perform a given action (e.g. put cheese on each hamburger patty), then the indicator light 756 may be used to indicate a deviation from the default or the normal action (e.g. not to put cheese on a given hamburger patty). Although described with respect to the indicator lights 756, the same may be true of any other indicator lights disclosed herein.

Figure 12:
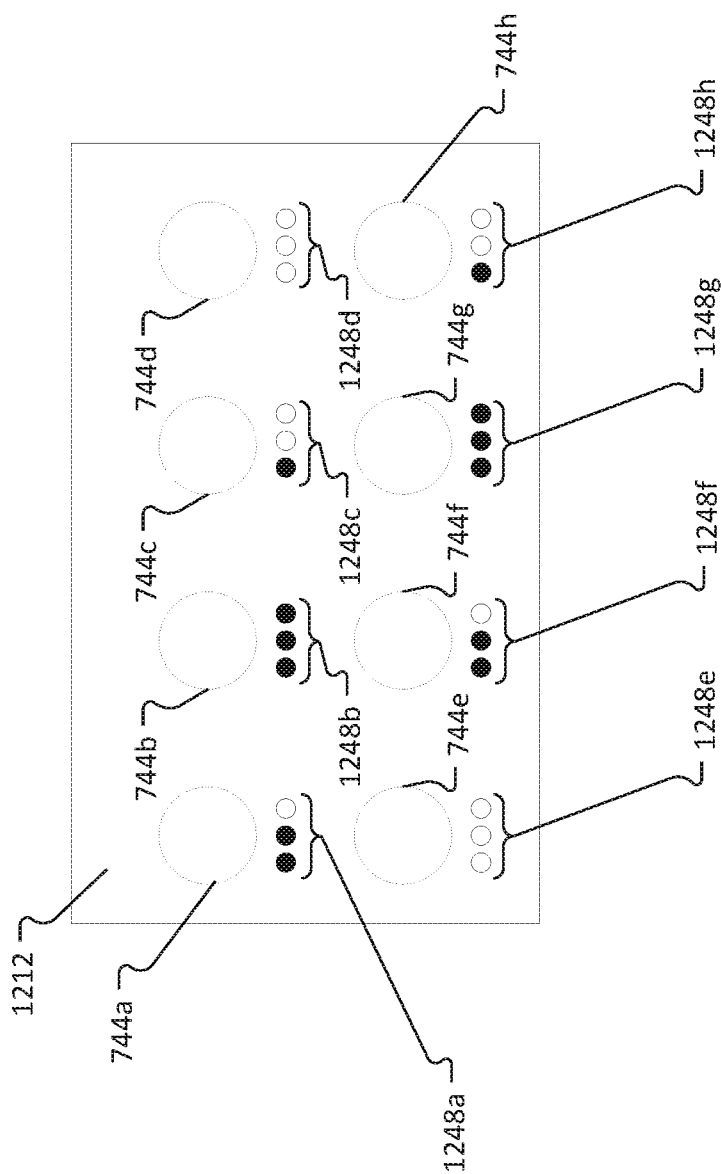
FIG. 12 is a top view of another portion of a make line according to at least one embodiment of the present disclosure.

Turning now to FIG. 12, in at least one embodiment a product preparation surface 1212 may comprise not just one indicator light 748 per product preparation station 744, but three indicator lights 1248 per product preparation station 744. The inclusion of three indicator lights 1248 per product preparation station 744 allows the system 100 to provide an indication to the make line operator as to the amount or quantity of each ingredient or component to be applied to the product at each station. For example, if hamburgers are being made on the product preparation surface 1212, and if ketchup is the ingredient currently being applied, then the make line operator would know that a normal amount of ketchup should be applied to the hamburgers being assembled at product preparation stations 744a and 744f based on the two illuminated indicator lights 1248a and 1248f; an above-normal amount of ketchup should be applied to the hamburgers being assembled at the stations 744b and 744g based on the three illuminated indicator lights 1248b and 1248g; a below-normal amount of ketchup should be applied to the hamburgers being assembled at the stations 744c and 744h based on the one illuminated indicator light 1248c and 1248h; and no ketchup should be applied to the hamburgers being assembled at the stations 744d and 744e based on the lack of any illuminated indicator light 1248d and 1248e.

The particular shape and arrangement of the indicator lights 1248 and product preparation stations 744 may, in embodiments, be different than they are as illustrated in FIG. 12. The indicator lights 1248 may be positioned on any one or more sides of the product preparation stations 744. The indicator lights may be arranged in a column or in a row, or they may be arranged in a non-linear manner. For example, one indicator light may be above a product preparation station, one indicator light may be to one side of the product preparation station, and one indicator light may be below or to the other side of the product preparation station. Depending on the level of precision required in a particular application, more or fewer indicator lights may be used at each station. For example, where no quantity or amount information need be communicated to the make line operator, only one indicator light may be used per product preparation station. Where only two quantity options are available, only two lights may be used. Where four or more quantity options are available, four or more lights may be used. In at least one embodiment, combinations of lights may be used to indicate different quantity options. For example, two indicator lights may be used as follows to inform the make line operator to apply a below-normal, normal, or above-normal amount of a particular ingredient or component to the product being assembled: one light illuminated for a below-normal amount; the other light illuminated for an above-normal amount, and both lights illuminated for a normal amount.

Indicator lights such as indicator lights 1248 may also be used to provide information to the make line operator that is not quantity or amount information. For example, on a make line configured for making customized pizzas, two indicator lights may be used to indicate on which side of the pizza a particular ingredient should be placed. For example, a left indicator light could illuminate to indicate that an ingredient should be applied to the left side of the pizza, a right indicator light could illuminate to indicate that an ingredient should be applied to the right side of the pizza, and both indicator lights could illuminate to indicate that an ingredient should be applied to the entire pizza.

Figure 13:
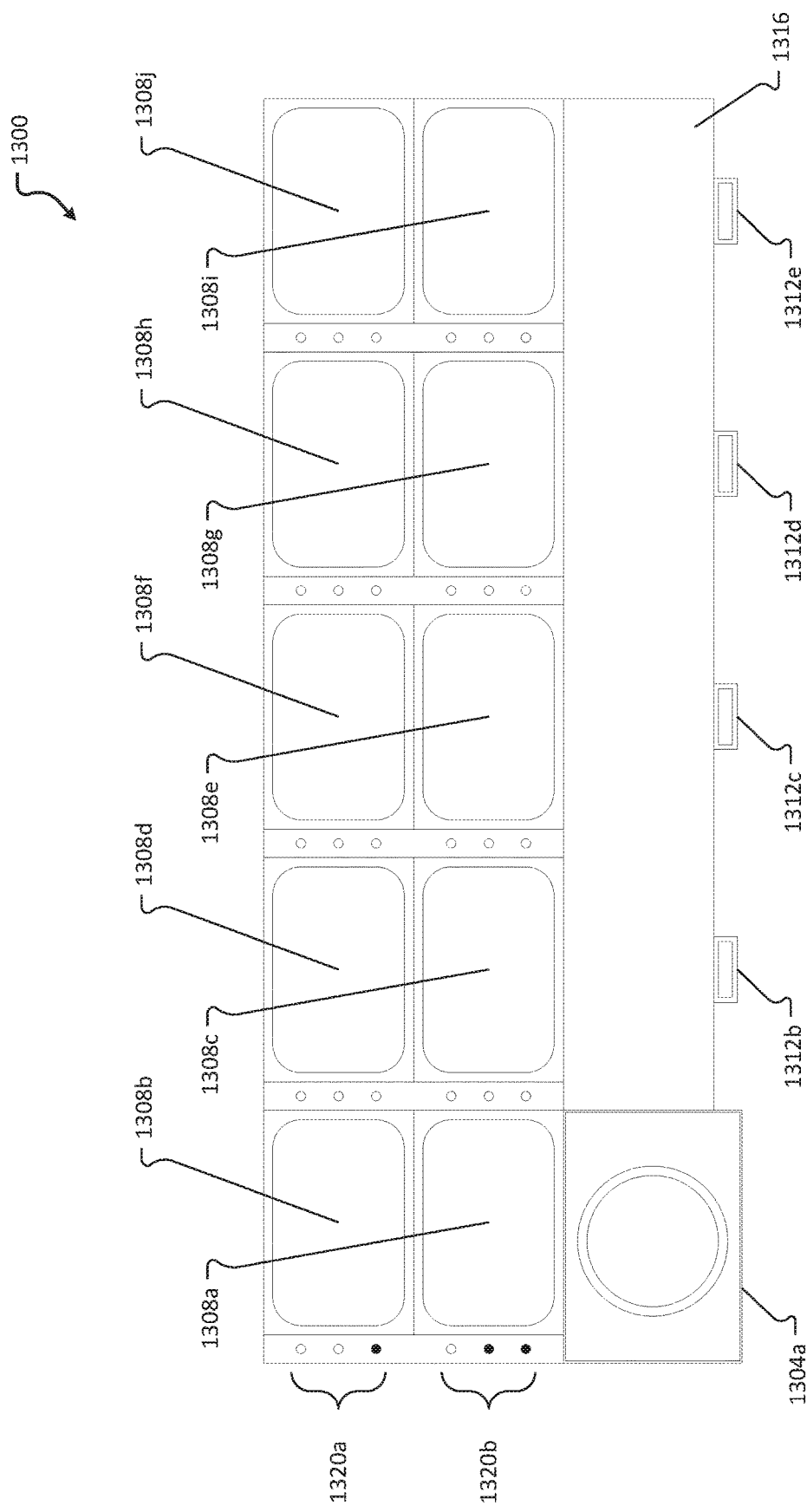
FIG. 13 is a top view of a make line according to at least one embodiment of the present disclosure.

Turning now to FIG. 13, and in contrast to the make line 700, a make line 1300 may be arranged for serial assembly or production of products. The make line 1300 comprises ingredient or component containers 1308a-1308j, each associated with a set of indicator lights 1320; a counter 1316; and a plurality of tray scanners 1312. The ingredient containers 1308 may the same as or similar to the ingredient containers 716. The indicator lights 1320 may be the same as or similar to the ingredient lights 312. The tray scanners 1312 may be the same as or similar to the proximity sensors 612 and/or the scanners 510, and are positioned to detect the presence of a tray or container 1304 and/or to identify a specific tray or container 1304.

In operation, a make line operator places a tray 1304a on the counter 1316 in front of or opposite the first two ingredient containers 1308a and 1308b. In at least one embodiment, a tray scanner 1312 determines that a tray is positioned on the counter 1316 adjacent the first and second ingredient containers 1308a and 1308b, which information is provided to the order server 102. The order server 102 causes the ingredient lights 1320 to illuminate as needed to inform the make line operator which ingredients or components (and/or how much or how many of each ingredient or component) to add to the product being assembled on the tray 1304a in order to prepare a first order in an order queue maintained by the order server 102. In other embodiments, the tray 1304a is uniquely identifiable (at least among other trays 1304 used with the make line 1300) and is associated with a specific order and/or a specific ordered product. In these embodiments, the tray scanner 1312 reads or scans identification information on the tray 1304, which information is provided to the order server 102. The order server 102 then determines which order or ordered product is associated with that tray, and causes the ingredient lights 1320 to illuminate as needed to inform the make line operator which ingredients or components (and/or how much or how many of each ingredient or component) to add to the product being assembled on the tray 1304a in order to prepare the specific order or ordered product associated with the tray 1304.

Once the make line operator applies the indicated ingredients to the product being made or assembled on the tray 1304a, the make line operator moves the tray 1304a down the counter to the next station (e.g. to a position over the tray scanner 1312b). The tray scanner 1312b may then sense that a tray is positioned at the station corresponding to the tray scanner 1312b, or may read identification information from the tray 1304a. The order server 102 may then receive a signal indicating that a tray, or the specific tray 1304a, is positioned at the station corresponding to the tray scanner 1312b, and may cause the ingredient lights 1320 associated with the ingredient containers 1308c and 1308d to indicate which ingredients (and/or how much or how many of each ingredient in the ingredient containers 1308c and 1308d) should be applied to the product being assembled on the tray 1304a.

As the tray 1304a is moved down the counter, each tray scanner 1312 may simply detect the tray 1304a's presence, in response to which the system 100 may cause each successive station to indicate which ingredients at that station should be applied to the product being assembled or made on the tray 1304a. Each time the tray scanner 1312a detects another tray, the system 100 may cause the corresponding station to provide indications corresponding to the next product in the order queue. For example, the first time the tray scanner 1312a detects a tray, the ingredient lights 1320a and 1320b may provide indications corresponding to a first product in an order queue; the second time the tray scanner 1312a detects a tray, the ingredient lights 1320a and 1320b may provide indications corresponding to a second product in the order queue; and so on for each subsequent tray detected by the order scanner 1312a. The same procedure may then be used for each subsequent station, e.g., the first time a given tray scanner 1312 detects a tray, the system 100 will cause the indicator lights at that station to provide indications corresponding to the first order in the order queue, and so forth.

While encompassed within the present disclosure, the method of operation described above may have certain drawbacks. For example, if a tray scanner 1312 makes an erroneous reading (e.g. detects a tray when in fact no tray has been placed on the counter at that station, or when a tray has been placed on the counter at that station but it corresponds to a different product than the next product in the order queue), then every subsequent product will receive the wrong indications at that station, until the error is noticed and corrected. Similarly, unless display screens 412 are used in conjunction with the make line 1300, a make line operator may not have any convenient way to confirm that the indications for a given product are accurate.

The use of scanners 510, that can read or otherwise detect identification information on each tray 1304, as tray scanners 1312 avoids the foregoing shortcomings. When scanners 510 are used, the order server 102 can associate a specific product with a specific tray 1304, and the order server 102 can cause the indicator lights 1320 at any station to provide proper indications for the product at that station, regardless of whether the products being assembled are assembled in the same order as they are listed in the order queue. Thus, if an ingredient container 1308 needed to be replenished before a assembly of particular product could be finished, but one or more other products did not need the missing ingredient, then the one or more other products could continue to be assembled without causing any error in the provided indications. Additionally, once the missing ingredient was replenished, then the product requiring that ingredient could be re-inserted into the production sequence, again without creating any errors in the provided indications.

In light of the foregoing description, if the make line 1300 is used to make burritos, then an order server 102 may associate a first ordered burrito with a tray 1304*a*, a second ordered burrito with a tray 1304*b*, and a third ordered burrito with a tray 1304*c*. Assembly of the first ordered burrito on tray 1304*a* is commenced first, as depicted in FIG. 13, where indicator lights 1320*a* indicate that a normal amount of the ingredient or component in the ingredient container 1308*a* (e.g. rice or beans) should be applied to the first ordered burrito, and the indicator lights 1320*b* indicate that a below-normal amount of the ingredient in the ingredient container 1308*b* should be applied to the first ordered burrito.

Figure 14:
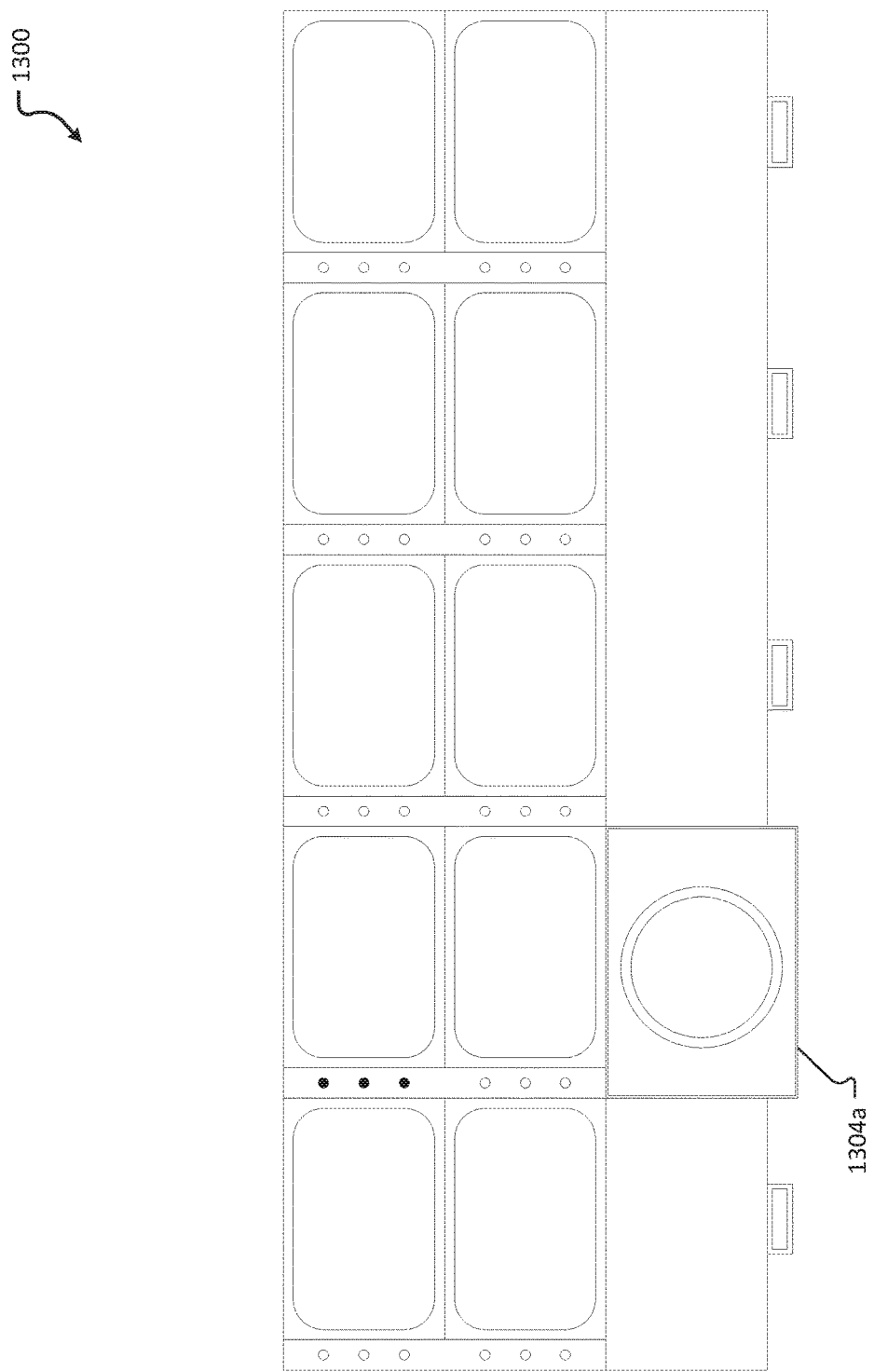
FIG. 14 is another top view of a make line according to another embodiment of the present disclosure.

Once those ingredients are applied, the make line operator moves the tray 1304*a* down the counter to the next station, where the tray scanner 1312*b* identifies the tray 1304*a* as being associated with the first ordered burrito, and an order server 102 causes the indicator lights 1320*c* and 1320*d* to provide the proper indications for the ingredients in the ingredient containers 1308*c* and 1308*d* with respect to the first ordered burrito, as shown in FIG. 14. Specifically, the indicator lights 1320*c* indicate that the ingredient in the ingredient container 1308*c* should not be applied to the first ordered burrito, and the indicator lights 1320*d* indicate that an above-normal amount of the ingredient in the ingredient container 1308*d* should be applied to the first ordered burrito.

Figure 15:
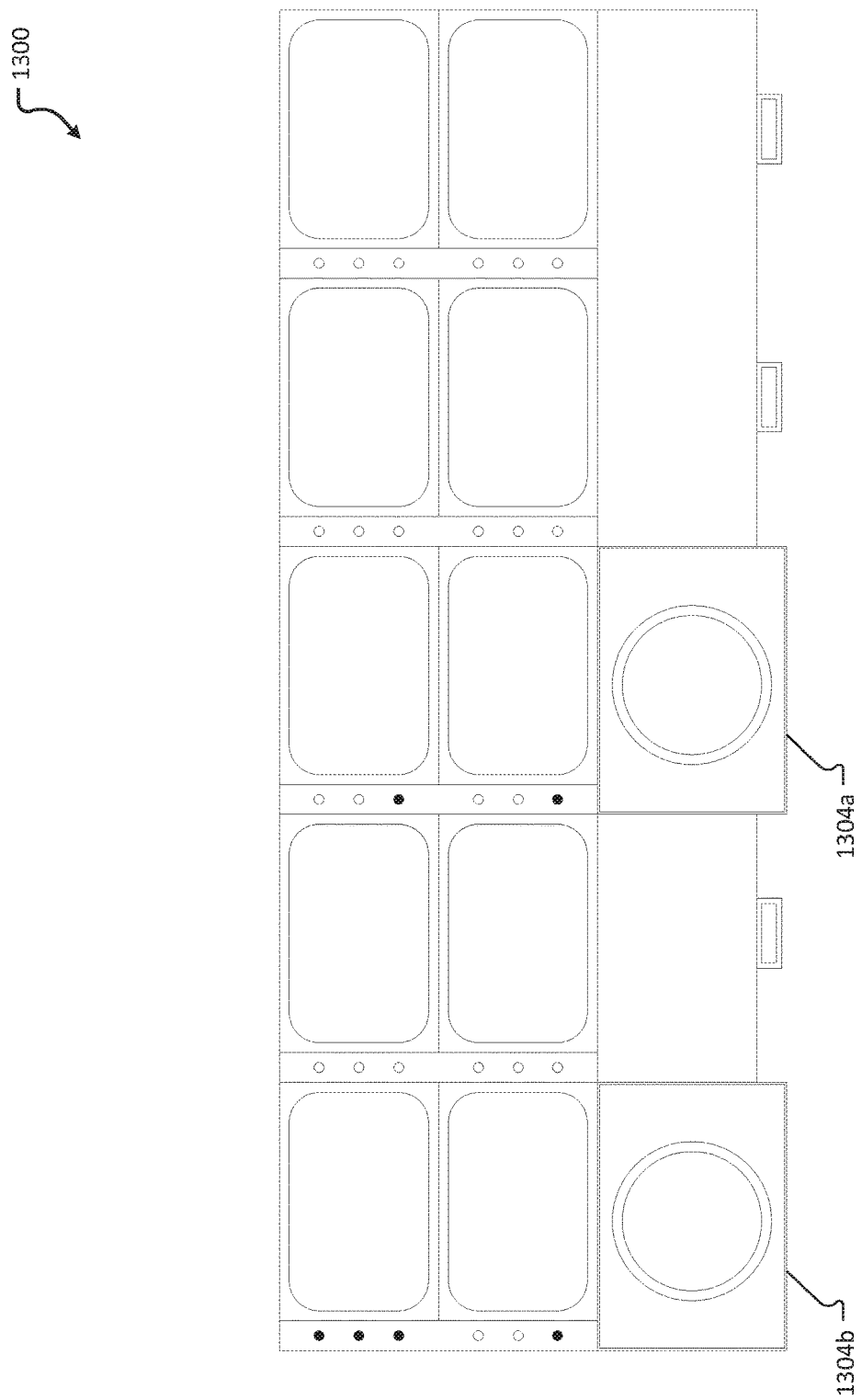
FIG. 15 is yet another top view of a make line according to at least one embodiment of the present disclosure.

As illustrated in FIG. 15, once the tray 1304*a* has all necessary ingredients from the station associated with the tray scanner 1312*b*, the make line operator again moves the tray 1304*a* down the counter 1316 to the station corresponding to the tray scanner 1312*c*, which identifies the tray 1304*a*. The order server 102 then causes the indicator lights 1320*e* and 1320*f* provide the proper indications for the first ordered burrito (which, as shown in FIG. 15, indicate that the first ordered burrito should receive a below-normal amount of the ingredient in each of ingredient containers 1308*e* and 1308*f*). Also, the tray 1304*b* is placed on the counter 1316 at the first station, where a tray scanner 1312 identifies the tray as tray 1304*b* and the order server 102 causes the indicator lights 1320*a* and 1320*b* to provide indications for the second ordered burrito (e.g. that a below-normal amount of the ingredient in the ingredient container 1308*a* should be applied to the second-ordered burrito, and that an above-normal amount of the ingredient in the ingredient container 1308*b* should be applied to the second-ordered burrito).

Figure 16:
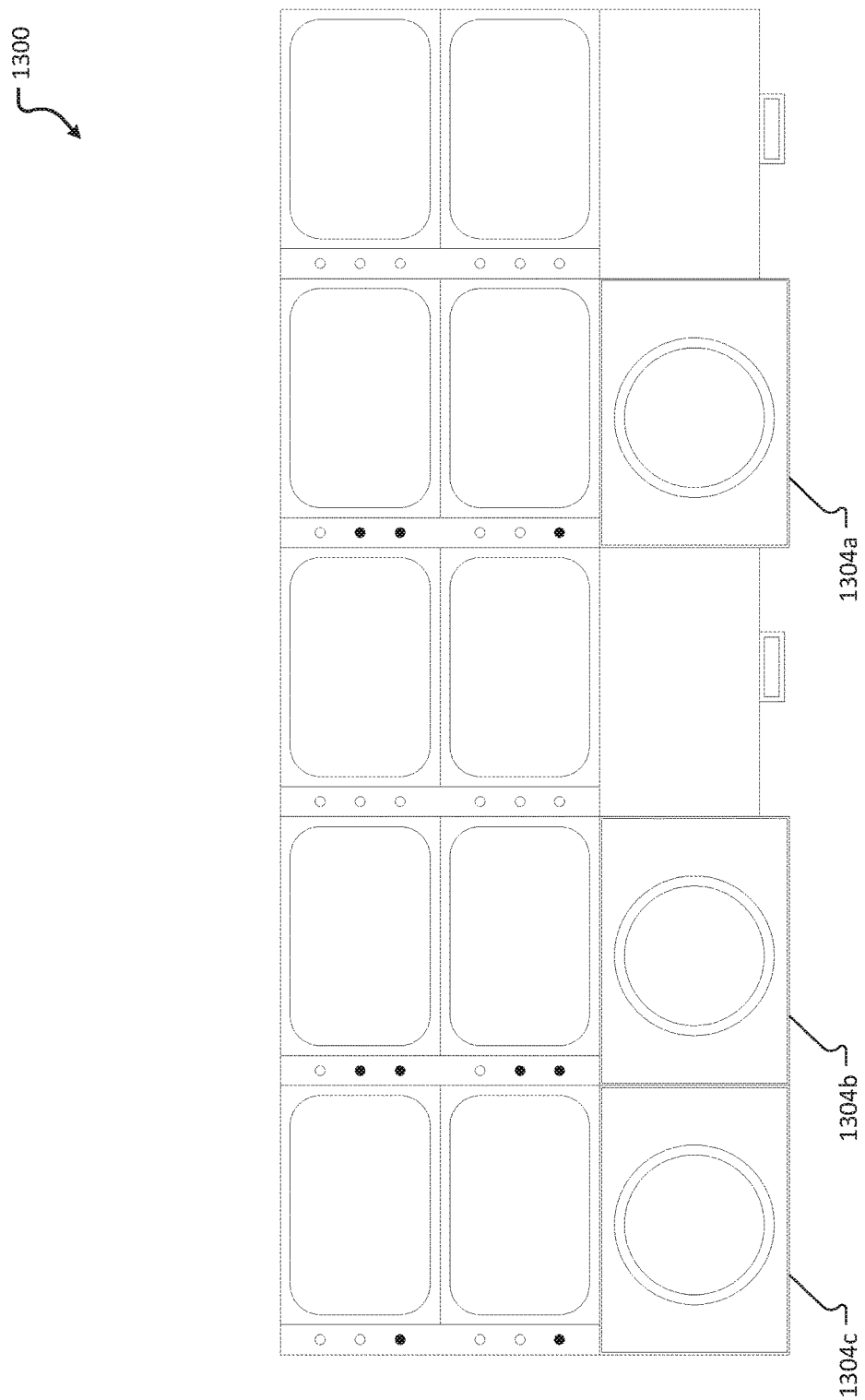
FIG. 16 is still another top view of a make line according to at least one embodiment of the present disclosure.

In FIG. 16, the trays 1304*a* and 1304*b* have each been moved to the next station on the counter 1316, where they have been identified by the tray scanners 1312*b* and 1312*d* (not visible in FIG. 15). The order server 102 has caused the indicator lights 1320*h* and 1320*g* to provide proper indications for the first ordered burrito, and has also caused the indicator lights 1320*c* and 1320*d* to provide proper indications for the second ordered burrito. The tray 1304*c* has been added to the counter at the first station, where it has been identified by the tray scanner 1312*a* (also not visible in FIG. 15), and the order scanner 102 has caused the indicator lights 1320*a* and 1320*b* to provide proper indications for the ingredients in the ingredient containers 1308*a* and 1308*b* with respect to the third ordered burrito.

As may be appreciated based on the foregoing disclosure, the sequential make line 1300 may be operated to produce products in a sequential or serial fashion. The indicator lights 1320 at a given station provide indications only for the product currently at that station. As a product moves on a tray 1304 from one station to the next, a tray scanner 1312 identifies the tray 1304, which allows the order server 102 to cause the indicator lights 1320 at the appropriate station (e.g. the station at which the tray 1304 in question is located) to provide the proper indications for the ingredients located at that station with respect to the product on the tray 1304. Although FIGS. 13-16 depict three-light sets of ingredient lights 1320 corresponding to each ingredient container 1308, other embodiments may include more or fewer lights in each light set 1320. Additionally, although FIGS. 13-16 depict one possible arrangement of a sequential make line 1300, other arrangements are possible and are included within the scope of the present disclosure. For example, a sequential make line 1300 may include ingredient containers 1308 of different sizes and shapes; ingredient containers 1308 may be positioned in different locations relative to each other and relative to the other components of the make line 1300; and/or more or fewer tray scanners 1312 may be used.

Although the embodiment of FIGS. 13-16 utilizes trays 1304 to carry products, in other embodiments a product may be assembled directly on a counter 1316. In these embodiments, a make line operator may wear or carry a label or tag that may be read by a scanner 1312 and that may be associated by the order server 102 with a particular ordered product. Then, as the make line operator moves along the make line with the product, the scanner 1312 may scan the make line operator's label or tag, and the order server 102 may cause the indicator lights 1320 at that station to provide appropriate indications for the product associated with the make line operator's label or tag. In still other embodiments, a bowl, plate, wrapping paper sheet, wax paper sheet, carton, box, cart, tub, or any other object on which a product may be assembled may be labeled or tagged and used instead of a tray 1304. In at least one embodiment, even the product itself (e.g. a frame or other structural portion of a non-edible product, or a relatively large ingredient of an edible product, such as a burrito tortilla) may be labeled. In the case of edible products, the label may be printed directly on the product with an edible ink, or burned into the product using a laser, or stamped onto or into the product.

Further, although not described above, the make line 1300 may comprise an overhead lighting system 108, which may be used in addition to or instead of the indicator lights 1320. The tray scanners 1312 may be located underneath a transparent counter 1316, or on top of the counter 1316, or in any other position from which they can either detect that a tray has been moved into a corresponding station or identify a tray at a corresponding station. In at least one embodiment, a single tray scanner 1312 may correspond to multiple stations (e.g. a single tray scanner may be able to determine whether a tray is at any one or more of multiple stations, or identify a tray or trays at multiple stations).

Figure 17:
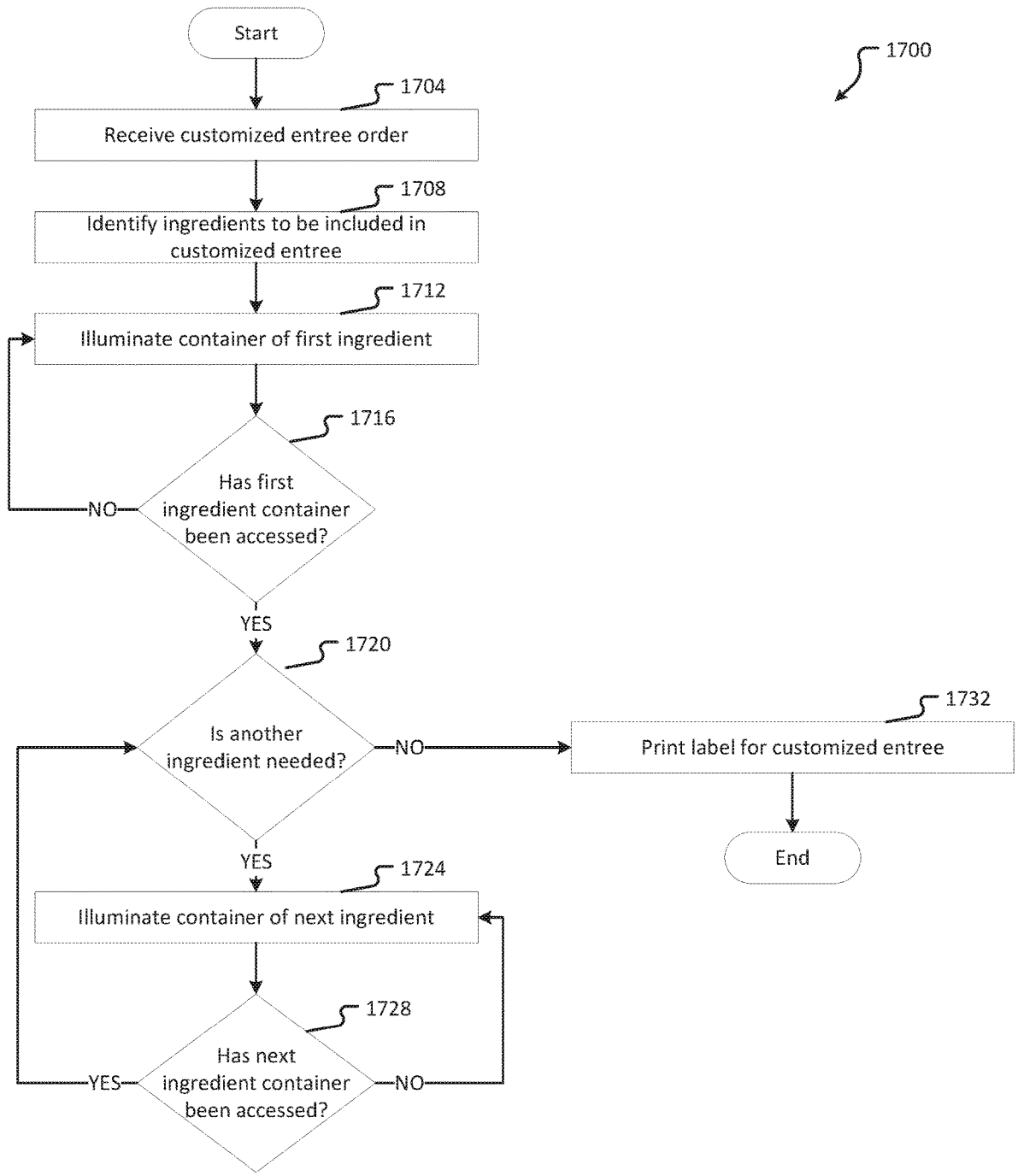
FIG. 17 is a flow diagram according to at least one embodiment of the present disclosure.

Turning now to FIG. 17, a method 1700 according to embodiments of the present disclosure comprises receiving a customized product order (step 1704). While the present disclosure may also be applied to make lines that only produce one, non-customized product, the present disclosure may be more beneficially applied to make lines that make customizable products. The order may be received at an order server 102 via a wide area network 114. The order may also be received at an order server 102 via a cashier terminal 104. The order server 102 may store the order in a new orders portion 126 of a memory 120 thereof. An order may be for one product or for many products. The products may be the same type of product, or different types of products. In at least one embodiment, the order server 102 evaluates the received customized product order to determine which ordered products can be made on a make line, and which cannot. For example, a received order at a hamburger establishment may include three hamburgers, three boxes of French fries, and three drinks, and the order server 102 may determine—or, more specifically, the processor 132 may determine—that the hamburgers will be made on a make line, while the French fry boxes and drinks will not. As another example, an order received by an order server at a burrito establishment may include two different kinds of burritos, a burrito bowl, a salad, and four drinks. In this example, the order server 102 may determine that the two burritos, the burrito bowl, and the salad will be made on the make line, while the four drinks will not.

The method 1700 also comprises identifying ingredients to be included in each customized product within the customized product order (step 1708). This step may comprise the processor 132 accessing the recipes 130 stored in the memory 120, and locating the specific recipe corresponding to the ordered product. In at least one embodiment, the recipe may identify required ingredients and optional ingredients. The required ingredients may be available in two or more varieties. Once the processor 132 identifies the proper recipe, the processor 132 may copy the recipe to a temporary location in the memory 120, then modify or complete the copied recipe based on the customized product order. For example, if a received customized product order is for a Super Hamburger with no pickles, then the processor 132 may access the table or database 250, create a temporary file associated with the received order and containing an ingredient list identifying mustard, ketchup, onion, and pickle as the needed ingredients, then compare the received customized product order to those ingredients and delete pickle from the ingredient list.

In at least one embodiment, the processor 132 may then reference the standard procedures 124 and/or other information stored in the memory 120 to determine such information as the proper order in which to illuminate the ingredients (e.g. so that the make line operator moves in one direction down the make line or along a series of ingredient containers, rather than jumping back and forth among ingredient containers), which indicator lights 312 and/or target lights 314 of a line-level lighting system 106 will need to be illuminated based on the ingredients in the temporary file and the product preparation station at which the product in question will be assembled, whether and in what manner to operate any projectors 414, laser pointers 418, and/or spotlights 422 to illuminate the needed ingredients, ingredient containers, and/or the product preparation station at which the product in question will be assembled. In at least one embodiment, the order server 102 may simply send a signal to the line-level lighting system controller 300 and/or the overhead lighting system controller that corresponds to a particular ingredient and/or a particular product preparation station, and the controllers 300 and/or 400 may utilize their processors 306 and 406 and information stored in their memories 302 and 402 to determine, based on the received signal, which ingredient lights 312, target lights 314, projectors 414, laser pointers 418, and/or spotlights 422 to operate and in what manner.

The method 1700 further comprises illuminating the container of the first ingredient (step 1712). Illuminating the container of the first ingredient may comprise illuminating one or more ingredient lights 312 corresponding to the ingredient container, and/or causing one or more of a projector 414, a laser pointer 418, and/or a spotlight 422 to illuminate the container of the first ingredient. In at least one embodiment, one or more target lights may also be illuminated (e.g. for a make line designed for the simultaneous preparation of multiple products, when the ingredient in question needs to be applied to multiple products being prepared). The illuminating may simply identify for the make line operator which ingredient to use, or it may inform the make line operator how much or how many of which ingredient to use.

Also included in the method 1700 is determining whether the first ingredient container has been accessed (step 1716). Determining whether the first ingredient container has been accessed may be accomplished by querying and/or receiving signals from one or more proximity sensors 612 associated with the first ingredient container. In at least one embodiment, the determination may be made only when an ingredient container (e.g. a ketchup bottle) has been removed from its storage location and then returned to its storage location. In other embodiments, the determination may be made as soon as an ingredient container has been removed from its storage location, or as soon as an ingredient container has been returned to its storage location. In still other embodiments, the determination may comprise determining that the weight of an ingredient container has changed, or that a motion sensor has detected movement over an ingredient container (e.g. from a hand reaching into the ingredient container). In at least one embodiment, the determination may comprise not only receiving an indication from a sensor, but also determining that a certain amount of time has passed since receipt of the most recent indication from a given sensor. For example, if the first ingredient container is a tub full of tomato slices, then the determination may comprise verifying both that a motion sensor indicates that a make line operator has reached into the tomato slice tub, and that a timer has measured 5 or 10 or 15 or 20 seconds since the indication from the motion sensor has been received. The specific amount of time may be, for example, an average amount of time that it takes a make line operator to place a tomato on a product (e.g. a hamburger) after accessing the tomato slice tub.

If the determination in step 1716 is that the first ingredient container has not been accessed, then the method returns to step 1712, and continues to illuminate the container of the first ingredient. If the determination in step 1716 is that the first ingredient container has been accessed, then the order server 102 determines whether another ingredient is needed (step 1720). The determination may comprise the processor 132 accessing the temporary file created in step 1708 and determining whether each ingredient has already been applied to the product (e.g. whether each ingredient container has been accessed).

If another ingredient does need to be applied to the product, then the ingredient container of the next ingredient is illuminated (step 1724). The illuminating of the next ingredient container may occur in substantially the same way as described above with respect to illuminating the first ingredient container. Once the next ingredient container has been illuminated, then a determination is made as to whether the next ingredient container has been accessed (step 1728). This determination may be accomplished in substantially the same way as determining whether the first ingredient container has been accessed. If so, then the order server 102 determines whether yet another ingredient is needed (step 1720). If not, then the method returns to step 1724, and continues to illuminate the container of the next ingredient.

If, in step 1720, the determination is that another ingredient is not needed, then a label is printed for the customized product (step 1732). The printing may occur using a label printer 118. Printing a label for the customized product may comprise illuminating an indicator light 312 or a target light 314 that informs the make line operator which of multiple products that were finished at approximately the same time corresponds to the label that has been printed.

In at least one embodiment, the method 1700 may comprise other steps, including, for example, wrapping, boxing, or otherwise packaging each completed product; deleting any temporary files created during the method 1700, and/or storing some or all of the information in the temporary files in a fulfilled orders portion 128 of the memory 120 of an order server 102; disassociating, in the memory 120 of the order server 102 or in any other computer-readable memory, a tray or similar object from the completed product so that it can be associated with a new product to be made; compiling or assembling a basic structure, framework, or base onto which the various ingredients will be applied or added; and/or cooking or otherwise completing initial preparation of one or more ingredients.

Figure 18:
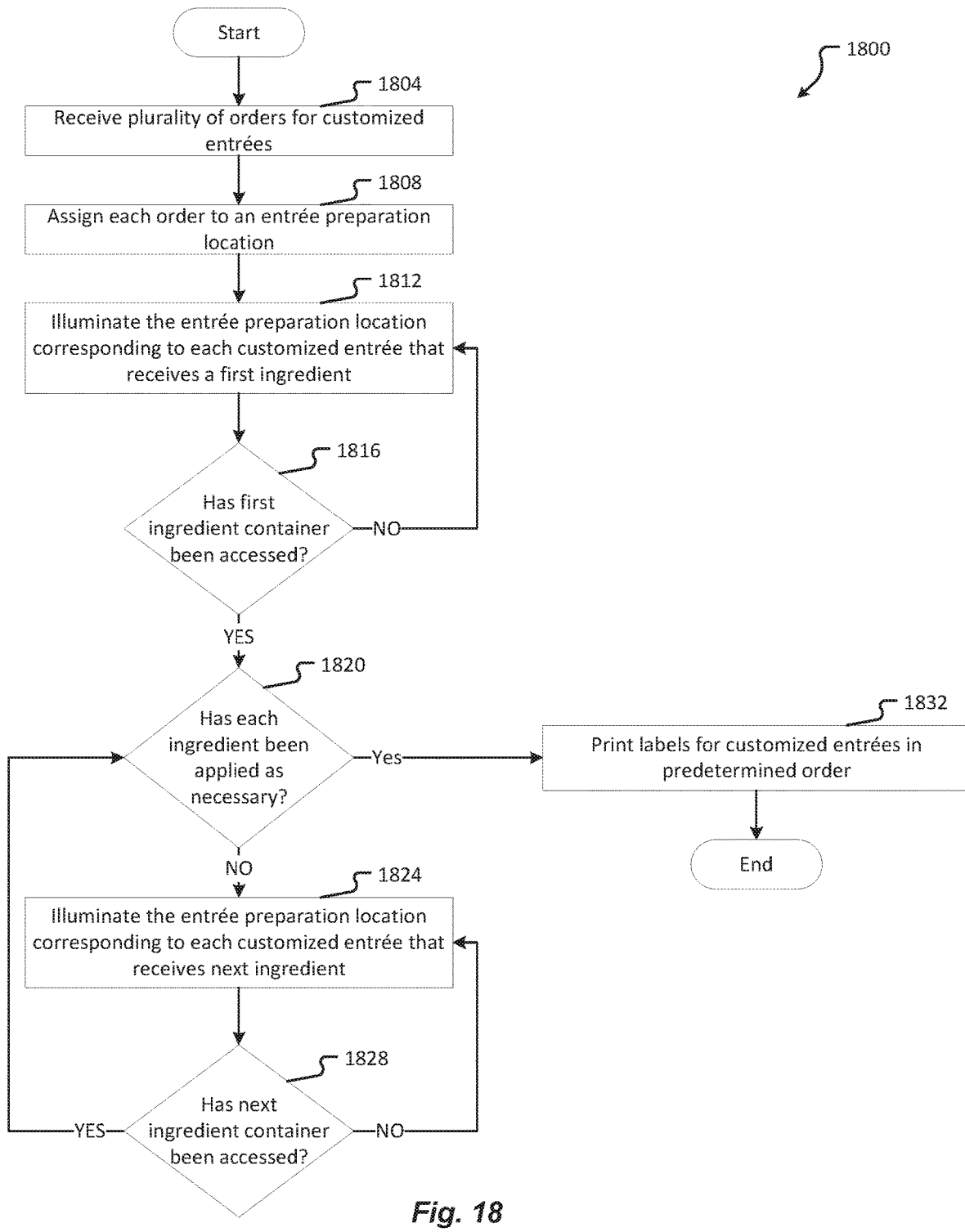
FIG. 18 is a flow diagram according to at least one embodiment of the present disclosure.

Turning now to FIG. 18, a method 1800 is similar to the method 1700 but is specifically tailored for use on a make line configured for the simultaneous preparation of multiple products. The method 1800 comprises receiving a plurality of orders for customized products 1804. The step 1804 is substantially the same and may be completed in substantially the same manner as described above with respect to the step 1704 of the method 1700, except that the step 1804 comprises receiving multiple product orders rather than one or more product orders.

The method 1800 also comprises identifying ingredients to be included in each customized product (step 1806). The identification of ingredients to be included in each customized product may be accomplished in substantially the same manner described above with respect to step 1708 of the method 1700.

The method 1800 further comprises assigning each order to a product preparation location (step 1808). As discussed above with respect to the make line 700, a make line may have a plurality of product preparation locations or product preparation stations 744. The order server 102 (and more specifically, the processor 132 of the order server 102) may correlate each product to be made or assembled with a given product preparation station or location, so that the proper target lights 314 may be illuminated at the appropriate time to inform the make line operator which products should receive each ingredient. In at least one embodiment, the processor 132 may simply correlate each product to be made or assembled with an identifier (which may be, for example, a number), which identifier may then be provided to one or both of the line-level lighting system 106 and the overhead lighting system 108 together with information about one or more ingredients to be applied to the product associated with the identifier. The line-level lighting system 106 (or more particularly, the controller 300) and/or the overhead lighting system 108 (or more particularly, the controller 400) may then associate the identifier with a specific product preparation location. Then, when the order server 102 sends signals to the line-level lighting system 106 and/or to the overhead lighting system 108 regarding which products (identified by their identifiers) should receive a given ingredient, the line-level lighting system 106 and/or the overhead lighting system 108 may determine which target lights 314 to illuminate based on its own association of the identifiers with the product preparation stations.

As evident from the foregoing disclosure, the association of a given product identifier with a product preparation station may comprise an association of a given product identifier with a specific target light 314. For example, a product with an identifier 1 may be associated with a target light with an identifier of A. Then, every time the line-level lighting system 106 and/or the overhead lighting system 108 receives a signal indicating that a given ingredient should be applied to the product associated with the identifier 1, the line-level lighting system 106 and/or the overhead lighting system 108 may cause the target light with the identifier A to illuminate for the ingredient in question.

The method 1800 still further comprises illuminating the product preparation location corresponding to each customized product that receives the first ingredient (step 1812). The illuminating may comprise, for example, illuminating a target light 314 associated with each product preparation location corresponding to each customized product that receives the first ingredient. The illuminating may also comprise, for example, using a projector 414, a laser pointer 418, and/or a spotlight 422 to illuminate the actual product preparation location or a portion thereof, in a manner sufficient to inform the make line operator that the product being assembled at each illuminated station should receive the first ingredient.

In embodiments where the ingredients are always applied in a particular order, there may be no need to illuminate an ingredient container corresponding to the first ingredient. However, in embodiments where the ingredients are not always applied in the same order, or to assist a make line operator even in embodiments where the ingredients are always applied in the same order, the method 1800 may also comprise illuminating the ingredient container of the first ingredient. Illuminating the ingredient container of the first ingredient may occur in the same or in a substantially similar manner as in the step 1712 of the method 1700.

The method 1800 further comprises determining whether the first ingredient container has been accessed (step 1816). The determination may be made in the same manner as, or in a manner substantially similar to, the manner described above with respect to the step 1716. Additionally, in at least one embodiment, this determination may be made simply by measuring a given amount of time from the moment of receipt of an indication that the first ingredient container has been accessed. In other embodiments, one or more sensors connected to a sensor network controller such as the sensor network controller 600 may be used to examine each product being assembled to determine whether the ingredient has been applied. For example, on a hamburger make line, an overhead camera could analyze an image of the hamburgers being assembled at a plurality of product preparation locations and determine whether a given ingredient (e.g. ketchup, tomato, pickle, etc.) has been applied to the appropriate hamburgers. If the first ingredient container has not been accessed, then the step 1812 of illuminating the product preparation location corresponding to each customized product that receives the first ingredient may be continued or repeated. If the first ingredient container has been accessed, then the method may continue to step 1820.

In step 1820, the order server 102 may determine whether any other ingredients remain to be applied. This determination may be made in the same manner or in a manner substantially similar to the manner in which the determination in step 1720 of the method 1700 is made. If the order server 102 determines that another ingredient still needs to be applied, then the method 1800 continues with the illumination of the product preparation location corresponding to each customized product that needs to receive the next ingredient (step 1824). Here again, in at least one embodiment an ingredient light 312 or other illumination of an ingredient container corresponding to the next ingredient may be used to indicate to the make line operator which ingredient to apply to the products being assembled at the illuminated product preparation locations.

The method 1800 still further comprises determining whether the next ingredient container has been accessed, which may be accomplished in the same manner or in a manner substantially similar to the manner in which the determination of whether the first ingredient container has been accessed is made (e.g. in step 1816). If not, then the illumination of the product preparation location corresponding to each customized product that receives the next ingredient (e.g. step 1824) may continue or be repeated. If so, then the method 1800 repeats step 1820.

If, in step 1820, the determination is that another ingredient is not needed, then a label is printed for the customized products in a predetermined order (step 1832). The printing may occur using a label printer 118. Printing a label for the customized products in a predetermined order may comprise illuminating an indicator light 312 or a target light 314 that informs the make line operator which of the customized products corresponds to the label that has been printed.

As with the method 1700, the method 1800 in at least one embodiment may comprise other steps, including, for example, wrapping, boxing, or otherwise packaging each completed product; deleting any temporary files created during the method 1800, and/or storing some or all of the information in the temporary files in a fulfilled orders portion 128 of the memory 120 of an order server 102; disassociating, in the memory 120 of the order server 102 or in any other computer-readable memory, a tray or similar object from the completed product so that it can be associated with a new product to be made; disassociating, in the memory 120 of the order server 102 or in any other computer-readable memory, any product identifiers from a given target 314 or other component of the system 100 that has been associated with a product identifier during the method 1800; compiling or assembling a basic structure, framework, or base onto which the various ingredients will be applied or added; and/or cooking or otherwise completing initial preparation of one or more ingredients.

The exemplary systems and methods of this disclosure have been described in relation to systems and methods for make line optimization. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein.

Furthermore, while the exemplary aspects, embodiments, options, and/or configurations illustrated herein show the various components of a device or system collocated, certain components of the system can be located remotely, at distant portions of a distributed network, such as a LAN and/or the Internet, or within a dedicated system. Additionally, it should be appreciated that some components of a system can be combined into one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet other embodiments, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In other embodiments, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Any of the steps, functions, and operations discussed herein can be performed continuously and automatically.

What is claimed is:

1. A make line, comprising:
    a plurality of sections positioned in a horizontal plane;
    a heating surface comprising a plurality of heating stations in a first section of the plurality of sections;
    a product preparation surface in a second section of the plurality of sections;
    a plurality of product assembly stations at which a plurality of separate orders may be assembled simultaneously, the plurality of product assembly stations arranged in rows and columns on the product preparation surface and delimited by visible markings, the plurality of product assembly stations in the second section;
    a plurality of ingredient containers next to and separate from the product preparation surface, the plurality of ingredient containers in a third section of the plurality of sections; and
    a line level lighting system, comprising:
        a plurality of ingredient lights in the third section, at least one ingredient light positioned adjacent each one of the plurality of ingredient containers;
        a plurality of target lights in the second section, at least one target light positioned adjacent each one of the plurality of product assembly stations, wherein each of the target lights are fixed in position; and
        a line level lighting system controller comprising an ingredient light interface, a target light interface, a first processor, and a first memory storing first instructions for execution by the first processor that, when executed by the first processor, cause the first processor to generate and transmit signals for selectively operating the plurality of ingredient lights and the plurality of target lights to simultaneously identify at least one ingredient container holding an ingredient for an order and at least one product assembly station at which the order is being assembled.

2. The make line of claim 1, further comprising:
    an overhead lighting system comprising:
        at least one overhead illumination device positioned above the heating surface and configured to selectively illuminate at least one of the heating stations; and
        an overhead lighting system controller comprising an illumination device interface, a second processor, and a second memory storing second instructions for execution by the second processor that, when executed by the second processor, cause the second processor to generate and transmit signals for selectively operating the at least one illumination device.

3. The make line of claim 1, further comprising:
    an order identification reader system comprising:

at least one scanner; and an order identification reader comprising a scanner interface, a third processor, and a third memory, the third memory storing third instructions for execution by the third processor that, when executed by the third processor, cause the third processor to receive scanned information from the scanner and transmit an identification signal corresponding to the scanned information.

4. The make line of claim 1, further comprising:

a sensor network comprising:

at least one sensor positioned proximate to at least one of the plurality of ingredient containers and configured to generate a first access signal when the ingredient container is accessed; and a sensor network controller comprising a sensor interface, a fourth processor, and a fourth memory, the fourth memory storing fourth instructions for execution by the fourth processor that, when executed by the fourth processor, cause the fourth processor to receive the first access signal via the sensor interface and generate, in response to receipt of the first access signal, a second access signal.

5. The make line of claim 1, further comprising:

a label printer configured to print a label and, upon removal of the label from the label printer, to generate a completion signal.

6. The make line of claim 1, further comprising:

a cashier terminal comprising a graphical user interface.

7. The make line of claim 1, further comprising:

an order server comprising a line-level lighting system interface, a fifth processor, and a fifth memory, the fifth memory storing fifth instructions for execution by the fifth processor that, when executed, cause the fifth processor to transmit a first instruction signal to the line-level lighting system via the line-level lighting system interface, the first instruction signal comprising first instructions for selective operation of the plurality of ingredient lights and the plurality of target lights.

* * * * *